(12) United States Patent
Nishikawa et al.

(10) Patent No.: US 9,744,827 B2
(45) Date of Patent: Aug. 29, 2017

(54) THERMAL MANAGEMENT SYSTEM FOR VEHICLE

(71) Applicant: DENSO CORPORATION, Kariya, Aichi-pref. (JP)

(72) Inventors: Michio Nishikawa, Nagoya (JP); Nobuharu Kakehashi, Toyoake (JP); Norihiko Enomoto, Nagoya (JP); Yoshiki Katoh, Kariya (JP); Kengo Sugimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 149 days.

(21) Appl. No.: 14/782,563

(22) PCT Filed: Mar. 27, 2014

(86) PCT No.: PCT/JP2014/001782
§ 371 (c)(1),
(2) Date: Oct. 5, 2015

(87) PCT Pub. No.: WO2014/167796
PCT Pub. Date: Oct. 16, 2014

(65) Prior Publication Data
US 2016/0031288 A1 Feb. 4, 2016

(30) Foreign Application Priority Data

Apr. 8, 2013 (JP) .................... 2013-080373
Feb. 24, 2014 (JP) .................... 2014-032618

(51) Int. Cl.
B60H 1/00 (2006.01)
F01P 3/20 (2006.01)
(Continued)

(52) U.S. Cl.
CPC ...... B60H 1/00271 (2013.01); B60H 1/00278 (2013.01); B60H 1/00885 (2013.01);
(Continued)

(58) Field of Classification Search
CPC .. B60H 1/00271; B60H 1/22; B60H 1/00278; B60H 1/32; B60H 1/00885;
(Continued)

(56) References Cited

U.S. PATENT DOCUMENTS 5,203,498 A * 4/1993 Kajikawa ........... B60H 1/00885
237/12.3 B
5,497,941 A * 3/1996 Numazawa ............ B60H 1/004
165/43

(Continued)

FOREIGN PATENT DOCUMENTS

JP 2006096174 A 4/2006
JP 2011121551 A 6/2011
(Continued)

OTHER PUBLICATIONS

International Search Report and Written Opinion (in Japanese with English Translation) for PCT/JP2014/001782, mailed Jul. 1, 2014; ISA/JP.
(Continued)

Primary Examiner — Len Tran
Assistant Examiner — Claire Rojohn, III
(74) Attorney, Agent, or Firm — Harness, Dickey & Pierce, P.L.C.

(57) ABSTRACT

A heat medium circulation equipment, a first pump, and a second pump are connected to a first switching valve and a second switching valve. A heater core is connected to at least one of the first switching valve and the second switching valve, and connected to a heat medium circuit. A state, in which the heat medium discharged by a third pump flows into the heater core, is selected by switching of a switching device.

19 Claims, 18 Drawing Sheets

(51) Int. Cl.
*F01P 9/00* (2006.01)
*B60H 1/22* (2006.01)
*B60H 1/32* (2006.01)
*B60L 11/18* (2006.01)
*B60K 11/02* (2006.01)

(52) U.S. Cl.
CPC ................ B60H 1/22 (2013.01); B60H 1/32 (2013.01); B60L 11/1874 (2013.01); B60L 11/1875 (2013.01); F01P 3/20 (2013.01); F01P 9/00 (2013.01); *B60H 2001/00307* (2013.01); *B60K 11/02* (2013.01); *F01P 2060/08* (2013.01)

(58) Field of Classification Search
CPC ....... B60H 2001/00307; B60L 11/1875; B60L 11/1874; F01P 9/00; F01P 3/20; F01P 2060/08
USPC ........................................................ 165/202
See application file for complete search history.

(56) References Cited

U.S. PATENT DOCUMENTS

| | | | | |
|---|---|---|---|---|
| 5,904,052 A | * | 5/1999 | Inoue | B60H 1/00007 165/43 |
| 6,042,016 A | * | 3/2000 | Ikeda | B60H 1/00007 237/12.3 C |
| 2004/0231833 A1 | * | 11/2004 | Wang | B60H 1/005 165/202 |
| 2006/0032623 A1 | * | 2/2006 | Tsubone | B60H 1/00492 165/202 |
| 2006/0180235 A1 | | 8/2006 | Kubo et al. | |
| 2008/0210185 A1 | | 9/2008 | Kubo et al. | |
| 2011/0113800 A1 | * | 5/2011 | Sekiya | B60H 1/00278 62/151 |
| 2012/0085512 A1 | * | 4/2012 | Graaf | B60H 1/00278 165/51 |
| 2012/0125593 A1 | * | 5/2012 | Kakehashi | F01P 3/20 165/287 |
| 2012/0160581 A1 | | 6/2012 | Hoess | |
| 2012/0247126 A1 | * | 10/2012 | Murase | B60H 1/00885 62/3.3 |
| 2014/0374081 A1 | | 12/2014 | Kakehashi et al. | |

FOREIGN PATENT DOCUMENTS

| | | |
|---|---|---|
| JP | 2012111299 A | 6/2012 |
| JP | 2013503067 A | 1/2013 |
| JP | 2013230805 A | 11/2013 |

OTHER PUBLICATIONS

U.S. Appl. No. 14/408,854, filed Dec. 17, 2014, Enomoto et al.

* cited by examiner

THERMAL MANAGEMENT SYSTEM FOR VEHICLE

CROSS REFERENCE TO RELATED APPLICATIONS

This application is a U.S. National Phase Application under 35 U.S.C. 371 of International Application No. PCT/JP2014/001782 filed on Mar. 27, 2014 and published in Japanese as WO 2014/167796 A1 on Oct. 16, 2014. This application is based on and claims the benefit of priority from Japanese Patent Applications No. 2013-080373 filed on Apr. 8, 2013, and No. 2014-032618 filed on Feb. 24, 2014. The entire disclosures of all of the above applications are incorporated herein by reference.

TECHNICAL FIELD

The present disclosure relates to a thermal management system for use in a vehicle.

BACKGROUND ART

Up to now, Patent Document 1 discloses a heat control device for cooling a motor generator, an inverter, a battery, and a vehicle interior in an electric vehicle.

The heat control device in the conventional art includes a cooling circuit for circulating a coolant that cools the motor generator and the inverter, a first circulation circuit for circulating a coolant used for cooling the battery and the vehicle interior, and a second circulation circuit for circulating a coolant that passes through a vehicle exterior heat exchanger, and performs a heat exchange with an outside air.

Further, the heat control device includes a first valve that performs a connection and a disconnection between the cooling circuit and the first circulating circuit, a second valve that connects the cooling circuit to any one of the first circulation circuit and the second circulation circuit, and a third valve that performs a connection and a disconnection between the cooling circuit and the second circulation circuit. The heat control device switches a connection destination of the cooling circuit to the first circulation circuit or the second circulation circuit while controlling those respective valves.

A heat can be transferred between the coolant circulating in the second circulation circuit and the coolant circulating in the first circulation circuit by a heat transfer device. The heat transfer device transfers the heat from a lower-temperature coolant to a higher-temperature coolant between the coolant in the first circulation circuit and the coolant in the second circulation circuit.

The heat of the coolant in the first circulation circuit is transferred to the coolant in the second circulation circuit by the heat transfer device, and the heat of the coolant in the second circulation circuit is radiated to an outside air by the vehicle exterior heat exchanger with the result that the battery and the vehicle interior can be cooled.

The cooling circuit is connected to the first circulation circuit or the second circulation circuit by the aid of the first to third valves to radiate the heat of the coolant in the cooling circuit to the outside air by the vehicle exterior heat exchanger of the second circulation circuit with the result that the motor generator and the inverter can be cooled.

PRIOR ART DOCUMENT

Patent Document

Patent Document 1: JP 2011-121551 A

According to the above conventional art, in a cooling system for cooling multiple equipments such as the motor generator, the inverter, and the battery, there is an advantage that only one vehicle exterior heat exchanger is required, but there is a risk that the overall circuit configuration is complicated. The risk is more remarkable as the number of equipments is larger.

For example, there are an EGR cooler and an intake air cooler as equipments required to be cooled in addition to the motor generator, the inverter, and the battery, and those equipments are different in required cooling temperature from each other.

For that reason, when the coolant circulating through the respective equipments is to be made switchable for the purpose of appropriately cooling the respective equipments, the number of circulation circuits increases depending on the number of equipments. In association with the increase in the circulation circuits, the number of valves for connection or disconnection between the respective circulation circuits and the cooling circuits also increases, resulting in a risk that the configuration of the flow paths for connecting the respective circulation circuits and the cooling circuits becomes very complicated.

SUMMARY OF THE INVENTION

In view of the above circumstances, it is an objective of the present disclosure to simplify a configuration of a thermal management system for a vehicle, which is capable of switching a flow of a heat medium circulating through a heat medium circulation equipment, and to provide the thermal management system capable of utilizing a heat of a heat generation equipment by using a heat utilization equipment.

According to an aspect of the present disclosure, a thermal management system for a vehicle includes a first pump that draws and discharges a heat medium, a second pump that draws and discharges the heat medium, a third pump that draws and discharges the heat medium, a heat medium circulation equipment through which the heat medium circulates, a first switching valve, a second switching valve, a heat medium circuit in which the heat medium discharged by the third pump circulates, a heat generation equipment disposed in the heat medium circuit and generating a heat, a heat utilization equipment and a switching device. The first switching valve is connected with an outlet side of the first pump, an outlet side of the second pump, and an inlet side of the heat medium circulation equipment, and the first switching valve switches between a state in which the heat medium discharged from the first pump flows into the heat medium circulation equipment and a state in which the heat medium discharged from the second pump flows into the heat medium circulation equipment. The second switching valve is connected with an intake side of the first pump, an intake side of the second pump, and an outlet side of the heat medium circulation equipment, and the second switching valve switches between a state in which the heat medium flows out of the heat medium circulation equipment and into the first pump and a state in which the heat medium flows out of the heat medium circulation equipment and into the second pump. The heat utilization equipment is connected to at least one of the first switching valve and the second switching valve and connected to the heat medium circuit, and the heat utilization equipment utilizes the heat of the heat medium. The switching device switches between a state in which the heat medium discharged by one of the first pump and the second pump circulates through the heat utilization equipment and a state in which the heat medium discharged by the third pump circulates through the heat utilization equipment.

According to the above configuration, with the simple configuration in which the heat medium circulation equipment, the first pump and the second pump are connected to the first switching valve and the second switching valve, the thermal management system for a vehicle is capable of switching between a case in which the heat medium drawn and discharged by the first pump flows through the heat medium circulation equipment and a case in which the heat medium drawn and discharged by the second pump flows through the heat medium circulation equipment.

Further, the heat utilization equipment is connected to at least one of the first switching valve and the second switching valve, and the heat medium circuit, and the switching device switches between a state in which the heat medium drawn and discharged by one of the first pump and the second pump flows through the heat utilization equipment and a state in which the heat medium drawn and discharged by the third pump flows through the heat utilization equipment. Therefore, the heat medium can circulate between the heat utilization equipment and the heat generation equipment. Therefore, the heat of the heat generation equipment can be used by the heat utilization equipment.

EMBODIMENTS FOR EXPLOITATION OF THE INVENTION

Figure 1:
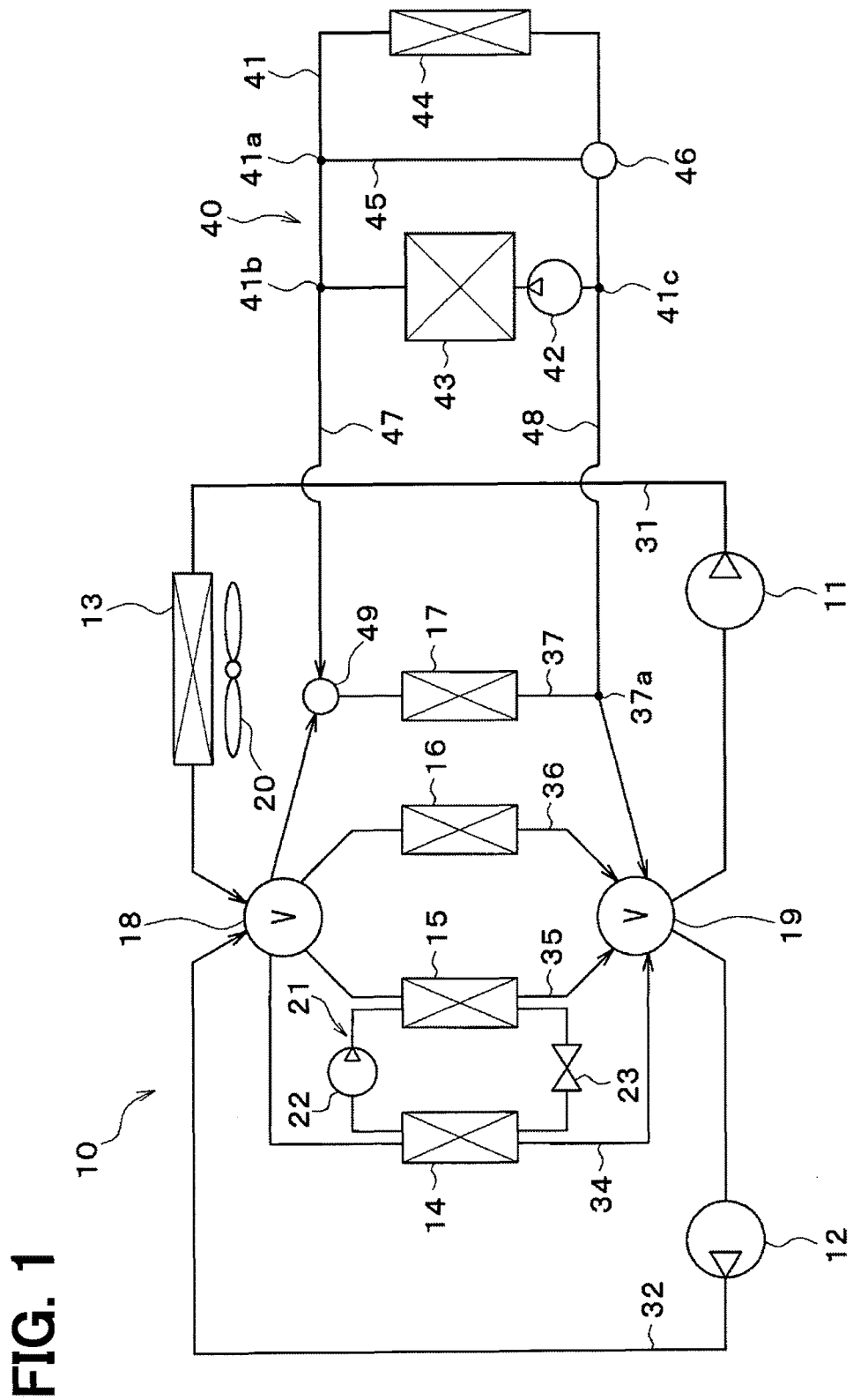
FIG. 1 is a schematic diagram illustrating a thermal management system for a vehicle, according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described below with reference to FIGS. 1 to 7. A thermal management system 10 for a vehicle, shown in FIG. 1 is used to appropriately adjust temperatures of various devices provided in a vehicle and a vehicle interior.

In the present embodiment, the thermal management system 10 is applied to a hybrid vehicle that obtains a drive force for the traveling of a vehicle from an engine (internal combustion engine) and an electric motor for traveling.

The hybrid vehicle of the present embodiment is formed as a plug-in hybrid vehicle that can charge a battery (in-vehicle battery), which is mounted on the vehicle, with power that is supplied from an external power supply (commercial power supply) at a time when the vehicle stops. For example, a lithium-ion battery can be used as the battery.

A drive force, which is output from the engine, is not only used for the traveling of the vehicle, and but also used for the operation of a generator. Further, an electric power generated by a generator and an electric power supplied from the external power supply can be stored in the battery, and the power stored in the battery is supplied to not only the traveling electric motor but also various in-vehicle devices including electric components configuring the thermal management system 10.

As illustrated in FIG. 1, the thermal management system 10 includes a first pump 11, a second pump 12, a radiator 13, a coolant cooler 14, a coolant heater 15, a temperature adjustment target equipment 16, a heater core 17, a first switching valve 18, and a second switching valve 19.

The first pump 11 and the second pump 12 are electric pumps that draw and discharge a coolant (heat medium). The coolant is a fluid serving as a heat medium. In the present embodiment, the coolant can be, for example, a liquid containing at least ethylene glycol, dimethylpolysiloxane or nanofluid, or antifreeze material.

The radiator 13, the coolant cooler 14, the coolant heater 15, the temperature adjustment target equipment 16, and the heater core 17 are examples of a coolant circulation equipment (heat medium circulation equipment) in which a coolant flows.

The radiator 13 is an example of a radiator (heat-medium outside-air heat exchanger) that radiates the heat of the coolant to an outside air by exchanging heat between the coolant and a vehicle exterior air (hereinafter referred to as "outside air"). The coolant at an outside air temperature or lower flows in the radiator 13 with the result that the coolant can absorb heat from the outside air by the radiator 13.

A coolant inlet side of the radiator 13 is connected to a coolant outlet side of the first pump 11. An outdoor blower 20 is an electric blower that blows the outside air to the radiator 13. The radiator 13 and the outdoor blower 20 are arranged in the foremost portion of the vehicle. For that reason, a traveling wind can be applied to the radiator 13 when the vehicle travels.

The coolant cooler 14 is an example of a low pressure side heat exchanger (heat medium cooling unit) that cools the coolant by exchanging heat between a low-pressure refrigerant of a refrigeration cycle 21 and the coolant. The coolant cooler 14 configures an evaporator of the refrigeration cycle 21.

The refrigeration cycle 21 is a vapor compression type refrigerator having a compressor 22, the coolant heater 15 as a condenser, an expansion valve 23, and the coolant cooler 14 as an evaporator. The refrigeration cycle 21 of the present embodiment uses a fluorocarbon refrigerant as the refrigerant, and configures a subcritical refrigeration cycle in which a high pressure-side refrigerant pressure does not exceed a critical pressure of the refrigerant.

The compressor 22 is an electric compressor that is driven by power supplied from a battery, and draws, compresses, and discharges the refrigerant of the refrigeration cycle 21. The coolant heater 15 is an example of a high pressure side heat exchanger (heat medium heating unit) that condenses a high pressure side refrigerant by exchanging heat between the high pressure side refrigerant discharged from the compressor 22 and the coolant.

The expansion valve 23 is depressurizing means for decompressing and expanding a liquid-phase refrigerant condensed by the coolant heater 15. The coolant cooler 14 is a low pressure side heat exchanger that evaporates a low-pressure refrigerant by exchanging heat between the low-pressure refrigerant decompressed and expanded by the expansion valve 23 and the coolant. A gas-phase refrigerant evaporated by the coolant cooler 14 is drawn into the compressor 22, and compressed.

All of the equipments configuring the refrigeration cycle 21 are stored in an engine room. Hence, when a temperature within the engine room rises, and the operation of the refrigeration cycle 21 stops (for example, when the vehicle is parked after traveling with a high load of the engine, or when the vehicle is parked under a scorching sun), a refrigerant temperature within the refrigeration cycle 21 may rise, and a pressure within the refrigeration cycle 21 may rise.

In order to suppress a rise in the pressure within the refrigeration cycle 21, it is effective to keep a low filling density of refrigerant. When R134a is used as the refrigerant, the filling density is set to be equal to or lower than 0.13 g/cm$^3$, as a result of which an internal pressure of the refrigeration cycle 21 can be prevented from exceeding 3 MPa even if the temperature within the engine room becomes high (for example, 100° C.).

In order to lessen the refrigerant filling density, and maintain a cooling and heating performance, an internal volume of the lower pressure side equipments (a pipe extending from an expansion part outlet of the expansion valve 23 to the low pressure side heat exchanger, the low pressure side heat exchanger, and a pipe extending from the low pressure side heat exchanger outlet side to an inlet port of the compressor 22) in the refrigeration cycle 21 increases. For the purpose of increasing the internal volume, the thermal management system 10 may be fitted with a tank. In that case, the tank also functions as a low pressure side equipment.

Because the refrigerant density in the interior of the low pressure side equipment is low in an operation state of the refrigeration cycle 21, the amount of refrigerant required to operate the cycle may not increase even if the internal volume of the low pressure side equipment increases. Therefore, the refrigerant filling density decreases more as the internal volume of the low pressure side equipment increases more. The refrigeration cycle 21 is configured so that the internal volume of the low pressure side equipment becomes twice or more as large as an internal volume of the high pressure side equipments (equipments other than the low pressure side equipments).

The radiator 13 cools the coolant by the outside air, and the coolant cooler 14 cools the coolant by a low-pressure refrigerant of the refrigeration cycle 21. For that reason, a temperature of the coolant cooled by the coolant cooler 14 becomes lower than a temperature of the coolant cooled by the radiator 13.

Specifically, the radiator 13 cannot cool the coolant to the temperature lower than the temperature of the outside air whereas the coolant cooler 14 is capable of cooling the coolant to the temperature lower than the temperature of the outside air.

Therefore, the coolant cooled by the outside air in the radiator 13 can be expressed as an intermediate temperature coolant, and the coolant cooled by the low-pressure refrigerant of the refrigeration cycle 21 in the coolant cooler 14 can be expressed as a low temperature coolant.

The temperature adjustment target equipment 16 specifically includes an intake air cooler, an exhaust gas cooler, a battery cooler, an inverter motor cooler, a CVT warmer, and a cooler core.

The intake air cooler is a heat exchanger that exchanges heat between an intake air becoming high temperature by being compressed by an engine supercharger and the coolant to cool the intake air. It is preferable that the intake air is cooled to about 30° C. The exhaust gas cooler is a heat exchanger for cooling the exhaust gas of the engine by the coolant.

The battery cooler is an equipment having a flow path of the coolant, for cooling the battery by applying the heat of the battery to the coolant. It is preferable that the battery be maintained at a temperature of about 10 to 40° C. for reasons such as the reduction of an output, the reduction of charging and discharging efficiency, and the prevention of degradation.

The inverter motor cooler is an equipment having a flow path of the coolant, for cooling an inverter travel electric motor by applying the heat of an inverter and a traveling electric motor to the coolant. The inverter is a power conversion device that converts a DC power, which is supplied from the battery, into an AC voltage and outputs the AC voltage to the traveling electric motor. It is preferable that the inverter is maintained at a temperature equal to or lower than 65° C. for the reason of the prevention of deterioration.

The CVT warmer is a heat exchanger that exchanges heat between a CVT oil (lubricant) used in a CVT (continuously variable transmission) and the coolant to heat the CVT oil. The cooler core is a cooling heat exchanger that exchanges heat between the coolant and blast air to the vehicle interior to cool the air blown into the vehicle interior.

The heater core 17 is a heating heat exchanger that exchanges heat between the blast air to the vehicle interior and the coolant to heat the air blown into the vehicle interior. In other words, the heater core 17 is an example of the heat utilization equipment (first heat utilization equipment) using the heat of the coolant.

The first pump 11 is disposed in a first pump flow path 31. The radiator 13 is disposed on an intake side of the first pump 11 in the first pump flow path 31. The second pump 12 is disposed in a second pump flow path 32.

The coolant cooler 14 is disposed in a coolant cooler flow path 34. The coolant heater 15 is disposed in a coolant heater flow path 35. The temperature adjustment target equipment 16 is disposed in an equipment flow path 36. The heater core 17 is disposed in a heater core flow path 37.

The first pump flow path 31, the second pump flow path 32, the coolant cooler flow path 34, the coolant heater flow path 35, the equipment flow path 36, and the heater core flow path 37 are connected to the first switching valve 18 and the second switching valve 19.

The first switching valve 18 and the second switching valve 19 are an example of a flow switching device that switches a flow of the coolant.

The first switching valve 18 has two inlets as coolant inlets, and has four outlets as coolant outlets. The second switching valve 19 has two outlets as coolant outlets, and has four inlets as coolant inlets.

A first inlet of the first switching valve 18 is connected with one end of the first pump flow path 31. In other words, the first inlet of the first switching valve 18 is connected with a coolant outlet side of the radiator 13.

A second inlet of the first switching valve 18 is connected with one end of the second pump flow path 32. In other words, the second inlet of the first switching valve 18 is connected with a coolant discharge side of the second pump 12.

A first outlet of the first switching valve 18 is connected with one end of the coolant cooler flow path 34. In other words, the first outlet of the first switching valve 18 is connected with a coolant inlet side of the coolant cooler 14.

A second outlet of the first switching valve 18 is connected with one end of the coolant heater flow path 35. In other words, the second outlet of the first switching valve 18 is connected with a coolant inlet side of the coolant heater 15.

A third outlet of the first switching valve 18 is connected with one end of the cooling and heating target equipment flow path 36. In other words, the third outlet of the first switching valve 18 is connected with a coolant inlet side of the temperature adjustment target equipment 16.

A fourth outlet of the first switching valve 18 is connected with one end of the heater core flow path 37. In other words, the fourth outlet of the first switching valve 18 is connected with a coolant inlet side of the heater core 17.

A first outlet of the second switching valve 19 is connected with the other end of the first pump flow path 31. In other words, the first outlet of the second switching valve 19 is connected with a coolant intake side of the first pump 11.

A second outlet of the second switching valve 19 is connected with the other end of the second pump flow path 32. In other words, the second outlet of the second switching valve 19 is connected with a coolant intake side of the second pump 12.

A first inlet of the second switching valve 19 is connected with the other end of the coolant cooler flow path 34. In other words, the first inlet of the second switching valve 19 is connected with a coolant outlet side of the coolant cooler 14.

A second inlet of the second switching valve 19 is connected with the other end of the coolant heater flow path 35. In other words, the second inlet of the second switching valve 19 is connected with a coolant outlet side of the coolant heater 15.

A third inlet of the second switching valve 19 is connected with the other end of the cooling and heating target equipment flow path 36. In other words, the third inlet of the second switching valve 19 is connected with a coolant outlet side of the temperature adjustment target equipment 16.

A fourth inlet of the second switching valve 19 is connected with the other end of the heater core flow path 37. In other words, the fourth inlet of the second switching valve 19 is connected with a coolant outlet side of the heater core 17.

The first switching valve 18 is so structured as to arbitrarily or selectively switch a communication state between the two inlets and the four outlets. Similarly, the second switching valve 19 is so structured as to arbitrarily or selectively switch a communication state between the two outlets and the four inlets.

Specifically, the first switching valve 18 switches each of the coolant cooler 14, the coolant heater 15, the temperature adjustment target equipment 16, and the heater core 17 to a state in which the coolant discharged from the first pump 11 flows therein, a state in which the coolant discharged from the second pump 12 flows therein, or a state in which the coolant discharged from the first pump 11 and the coolant discharged from the second pump 12 do not flow therein.

The second switching valve 19 switches each of the coolant cooler 14, the coolant heater 15, the temperature adjustment target equipment 16, and the heater core 17 to a state in which the coolant flows into the first pump 11, a state in which the coolant flows into the second pump 12, or a state in which the coolant do not flow into the first pump 11 and the second pump 12.

A structural example of the first switching valve 18 and the second switching valve 19 will be described in brief. Each of the first switching valve 18 and the second switching valve 19 includes a case forming an outer shell, and a valve body housed in the case. The inlets and the outlets of the coolant are defined at predetermined positions of the case, and the valve body is rotationally operated to change the communication state between the inlets and the outlets of the coolant.

The valve body of the first switching valve 18 and the valve body of the second switching valve 19 are rotationally driven by separate electric motors, individually. The valve body of the first switching valve 18 and the valve body of the second switching valve 19 may be rotationally driven by a common electric motor in conjunction with each other.

The thermal management system 10 includes an engine cooling circuit 40 (heat medium circuit). The engine cooling circuit 40 has a circulation flow path 41 through which the coolant circulates. The circulation flow path 41 configures a main flow path of the engine cooling circuit 40.

A third pump 42 (engine pump), an engine 43, and an engine radiator 44 are arranged in the circulation flow path 41 in series with each other in the stated order.

The third pump 42 is an electric pump that draws and discharges the coolant. The third pump 42 may be rotationally driven by the engine through a pulley, a belt, and the like. The engine 43 is an example of the heat generation equipment that generates heat in association with operation.

The engine radiator 44 is an example of a radiator (heat-medium outside-air heat exchanger) that radiates the heat of the coolant to the outside air by exchanging heat between the coolant and the outside air. The coolant of an outside air temperature or lower flows in the engine radiator 44 with the result that the coolant can absorb heat from the outside air by the engine radiator 44.

Blowing of the outside air toward the engine radiator 44 is performed by the outdoor blower 20. The engine radiator 44 is disposed on a downstream side of the radiator 13 in the direction of the outside air flow in the foremost portion of the vehicle.

The circulation flow path 41 is connected with a radiator bypass passage 45. The radiator bypass passage 45 is an example of the radiator bypass passage in which the coolant bypasses the engine radiator 44 in the engine cooling circuit 40.

One end of the radiator bypass passage 45 is connected to a portion 41a of the circulation flow path 41 which is located on a coolant outlet side of the engine 43 and on a coolant inlet side of the engine radiator 44. The other end of the radiator bypass passage 45 is connected to a portion of the circulation flow path 41 which is located on a coolant outlet side of the engine radiator 44 and an intake side of the third pump 42.

A thermostat 46 is disposed in a connection portion of the other end of the radiator bypass passage 45 and the circulation flow path 41. The thermostat 46 is a coolant temperature reaction valve including a mechanic mechanism for opening and closing a coolant flow channel by displacing a valve body by a thermo wax (temperature sensing member) which is changed in volume in accordance with the temperature.

Specifically, the thermostat 46 closes the radiator bypass passage 45 if a temperature of the coolant falls below a predetermined temperature (for example, lower than 80° C.), and opens the radiator bypass passage 45 if the temperature of the coolant exceeds the predetermined temperature (for example, 80° C. or higher).

The circulation flow path 41 is connected with a first connection flow path 47 and a second connection flow path 48. The first connection flow path 47 and the second connection flow path 48 are connection means for connecting the engine cooling circuit 40 and the heater core flow path 37.

One end of the first connection flow path 47 is connected to a portion 41b of the circulation flow path 41 which is located on a coolant outlet side of the engine 43 and on a coolant inlet side of the engine radiator 44. More specifically, one end of the first connection flow path 47 is connected to the portion 41b of the circulation flow path 41 between a connection part 41a of the circulation flow path 41 and a coolant outlet of the engine 43. The connection part 41a is connected with one end of the radiator bypass passage 45.

The other end of the first connection flow path 47 is connected to a portion of the heater core flow path 37 which is located between the first switching valve 18 and the heater core 17.

A three-way valve 49 is disposed in a connection portion between one end of the first connection flow path 47 and the heater core flow path 37. The three-way valve 49 is an example of the switching device for switching between a refrigerant flow channel that connects the first switching valve 18 side to the heater core 17 side, and a refrigerant flow channel that connects the engine cooling circuit 40 side to the heater core 17 side. The three-way valve 49 is configured by an electric valve mechanism.

One end of the second connection flow path 48 is connected to a portion 41c of the circulation flow path 41 which is located on a coolant outlet side of the engine radiator 44 and an intake side of the third pump 42. More specifically, one end of the second connection flow path 48 is connected to the portion 41c of the circulation flow path 41 which is located between the thermostat 46 and the third pump 42.

The other end of the second connection flow path 48 is connected to a portion 37a of the heater core flow path 37 which is located between the heater core 17 and the second switching valve 19. Therefore, the portion 37a of the heater core flow path 37 which is connected with the other end of the second connection flow path 48 is an example of a branch part in which the coolant branches to the engine cooling circuit 40 side.

Figure 2:
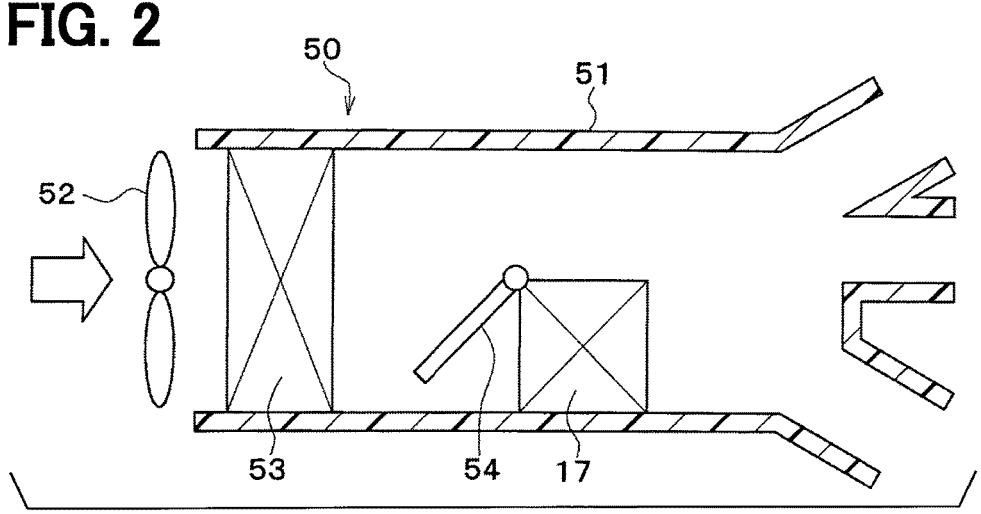
FIG. 2 is a schematic cross-sectional diagram illustrating a vehicle interior air conditioning unit according to the first embodiment.

As illustrated in FIG. 2, the heater core 17 is housed in a casing 51 of an indoor air conditioning unit 50. An indoor blower 52 is an electric blower that blows an inside air (vehicle interior air) or an outside air to the heater core 17.

The heater core 17 is disposed on a downstream side of the air flow of an air cooler 53 within the casing 51. The air cooler 53 is air cooling means for cooling blast air from the indoor blower 52. The air cooler 53 is formed of, for example, a cooler core that exchanges heat between the coolant and the blast air to cool the blown air.

An air mix door 54 is disposed between the air cooler 53 and the heater core 17 within the casing 51. The air mix door 54 is air flow rate adjustment means for adjusting a ratio of an air flow rate that passes through the heater core 17 and an air flow rate flowing in the heater core 17 as a bypass.

Next, an electric control unit of the thermal management system 10 will be described with reference to FIG. 3. A control device 60 includes a well-known microcomputer, which includes a CPU, a ROM, a RAM, and the like, and peripheral circuits thereof, and performs various arithmetic operation and processing on the basis of an air conditioning control program stored in the ROM to control the operations of the first pump 11, the second pump 12, the first switching valve 18, the second switching valve 19, the outdoor blower 20, the compressor 22, the third pump 42, the three-way valve 49, the indoor blower 52, and the air mix door 54 which are connected to an output side.

The control device 60 is integrated with a control unit that controls various control target devices connected to the output side of the control device 60, but a configuration (hardware and software) for controlling the operations of the respective equipments to be controlled forms a control unit that controls the operations of the respective equipments to be controlled.

In the present embodiment, a configuration (hardware and software) for controlling the operation of the first switching valve 18 and the second switching valve 19 forms a first switching control unit 60a. The first switching control unit 60a may be formed separately from the control device 60.

In the present embodiment, a configuration (hardware and software) for controlling the operation of the three-way valve 49 forms a second switching control unit 60b. The second switching control unit 60b may be formed separately from the control device 60.

Detection signals of various sensors such as an inside air sensor 61, an outside air sensor 62, a first water temperature sensor 63, a second water temperature sensor 64, a third water temperature sensor 65, and a refrigerant temperature sensor 66 are input to an input side of the control device 60.

The inside air sensor 61 is detecting means (inside air temperature detecting means) for detecting the temperature of inside air (vehicle interior temperature). The outside air sensor 62 is detecting means (outside air temperature detecting means) for detecting the temperature of outside air (vehicle exterior temperature).

The first water temperature sensor 63 is detecting means (first heat medium temperature detecting means) for detecting a temperature (for example, temperature of the coolant drawn into the first pump 11) of the coolant flowing in the first pump flow path 31.

The second water temperature sensor 64 is detecting means (second heat medium temperature detecting means) for detecting a temperature (for example, temperature of the coolant drawn into the second pump 12) of the coolant flowing in the second pump flow path 32.

The third water temperature sensor 65 is detecting means (third heat medium temperature detecting means) for detecting a temperature (for example, temperature of the coolant immediately after passing through the engine 43) of the coolant circulating in the engine cooling circuit 40.

Operation signals from various air-conditioning operation switches, which are provided on an operation panel 69 disposed close to a dashboard panel positioned at a front portion of the vehicle interior, are input to the input side of the control device 60. An air conditioner switch, an automatic switch, an air flow rate setting switch of the indoor blower 52, a vehicle interior temperature setting switch, and the like are provided as the various air-conditioning operation switches that are provided on the operation panel 69.

The air conditioner switch is a switch for switching the operation and stop (ON and OFF) of air-conditioning (cooling or heating). The automatic switch is a switch for setting or canceling the automatic control of air-conditioning. The vehicle interior temperature setting switch is target temperature setting means for setting a target temperature in the vehicle interior by the operation of an occupant.

Next, the operation of the above-mentioned configuration will be described. The control device 60 controls the operation of the first pump 11, the second pump 12, the first switching valve 18, the second switching valve 19, the compressor 22, the third pump 42, and the three-way valve 49, thereby switching among various operating modes.

For example, the first pump flow path 31 and at least one of the various equipment flow paths 34 to 37 configure a first cooling circuit C1 (first circulation circuit). The second pump flow path 32 and at least another flow path of the various equipment flow paths 34 to 37 configure a second cooling circuit C2 (second heat medium circuit).

Each of the various equipment flow paths 34 to 37 switches to a case to be connected to the first cooling circuit C1 and a case to be connected to the second cooling circuit C2 according to the situation with the results that the temperature adjustment target equipment 16 can be adjusted to an appropriate temperature according to the situation.

In other words, when the coolant cooler 14 and the temperature adjustment target equipment 16 are connected to the same cooling circuit, the temperature adjustment target equipment 16 can be cooled by the coolant cooled by the coolant cooler 14. For example, when the temperature adjustment target equipment 16 is a cooler core, the blast air to the vehicle interior is cooled by the cooler core so that the vehicle interior can be cooled.

When the coolant heater 15 and the temperature adjustment target equipment 16 are connected to the same cooling circuit, the temperature adjustment target equipment 16 can be heated by the coolant heated by the coolant heater 15.

When the coolant heater 15 and the heater core 17 are connected to the same cooling circuit, the blast air to the vehicle interior is heated by the heater core 17 so that the vehicle interior can be heated.

When the coolant cooler 14 is connected to the first cooling circuit C1, and the coolant heater 15 is connected to the second cooling circuit C2, a heat pump operation of the refrigeration cycle 21 can be performed.

In other words, in the first cooling circuit C1, since a low temperature coolant cooled by the coolant cooler 14 flows in the radiator 13, the coolant absorbs heat from the outside air in the radiator 13. The coolant that absorbs heat from the outside air in the radiator 13 exchanges heat with the refrigerant of the refrigeration cycle 21 in the coolant cooler 14 to radiate heat. Therefore, in the coolant cooler 14, the refrigerant of the refrigeration cycle 21 absorbs heat from the outside air through the refrigerant.

The refrigerant that absorbs heat from the outside air in the coolant cooler 14 exchanges heat with the coolant of the second cooling circuit C2 in the coolant cooler 14. Therefore, a heat pump operation that pumps the heat of the outside air can be realized.

Further, the control device 60 controls the operation of the three-way valve 49, to thereby switch to a state (connection mode) in which the heater core 17 is connected to the engine cooling circuit 40, and a state (disconnection mode) in which the heater core 17 is not connected to the engine cooling circuit 40.

Specifically, the three-way valve 49 switches to a refrigerant flow channel that connects the first switching valve 18 side to the heater core 17 side, resulting in a state (connection mode) in which the first cooling circuit C1 and the engine cooling circuit 40 are not connected to each other.

On the contrary, the three-way valve 49 switches to a refrigerant flow channel that connects the first switching valve 18 side to the heater core 17 side, resulting in a state (disconnection mode) in which the first cooling circuit C1 and the engine cooling circuit 40 are not connected to each other.

Figure 4:
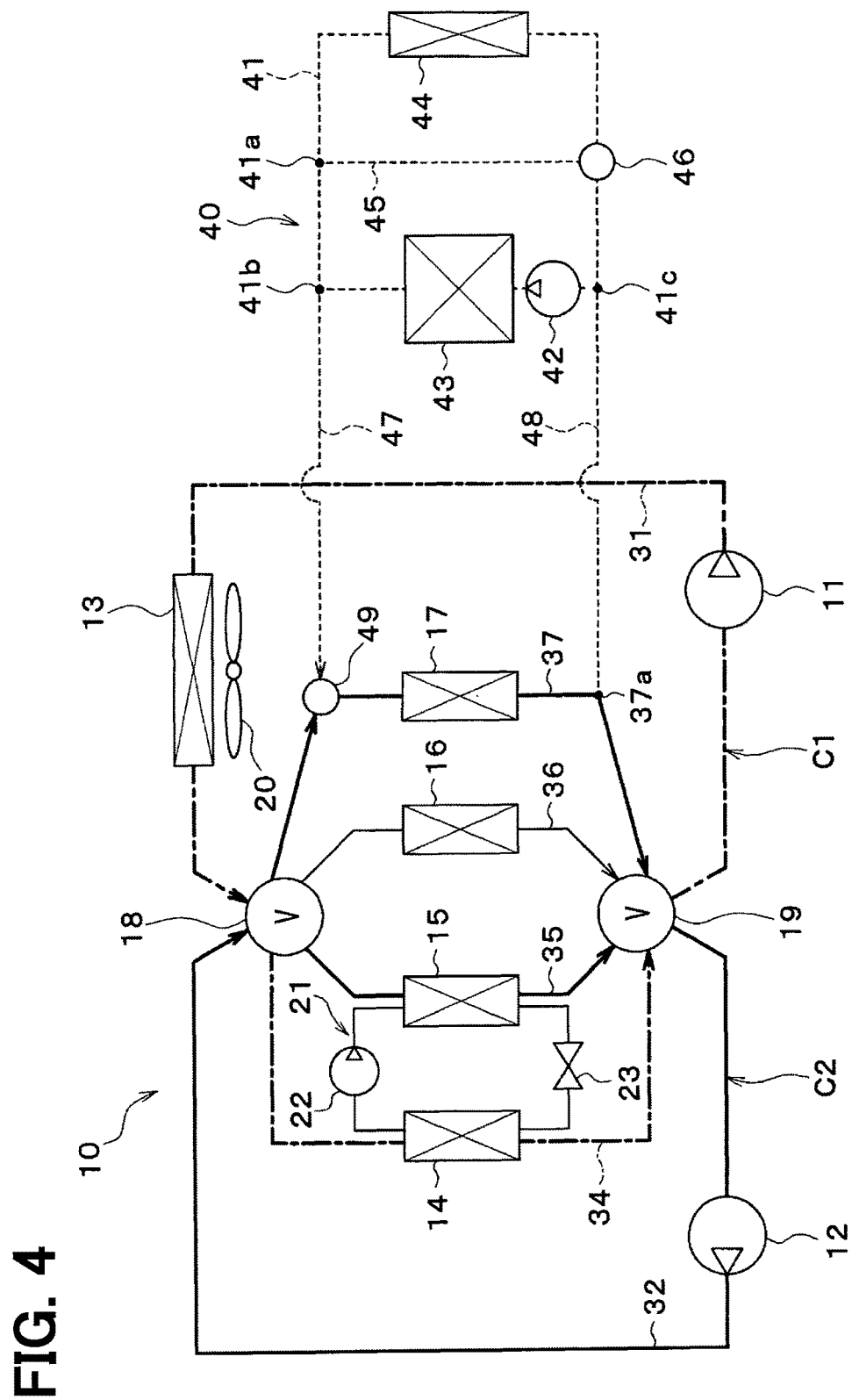
FIG. 4 is a schematic diagram illustrating a first operating mode in the vehicular thermal management system according to the first embodiment.

More specifically, the mode switches to first to fourth operating modes illustrated in FIGS. 4 to 7. The first operating mode illustrated in FIG. 4 is implemented when the engine 43 is during stop, and the travel mode of the vehicle is an EV travel mode. The EV travel mode is a travel mode in which the vehicle travels by the aid of a drive force of the traveling electric motor.

The first operating mode becomes a state (disconnection mode) in which the coolant cooler 14 is connected to the first cooling circuit C1, the coolant heater 15 and the heater core 17 are connected to the second cooling circuit C2, and the heater core 17 is not connected to the engine cooling circuit 40.

In the first operating mode, because the engine 43 is during stop, and the waste heat of the engine 43 is not generated, the blast air to the vehicle interior is heated by the heater core 17 with the use of the amount of heat obtained from the coolant heater 15 for operating the heater.

Figure 5:
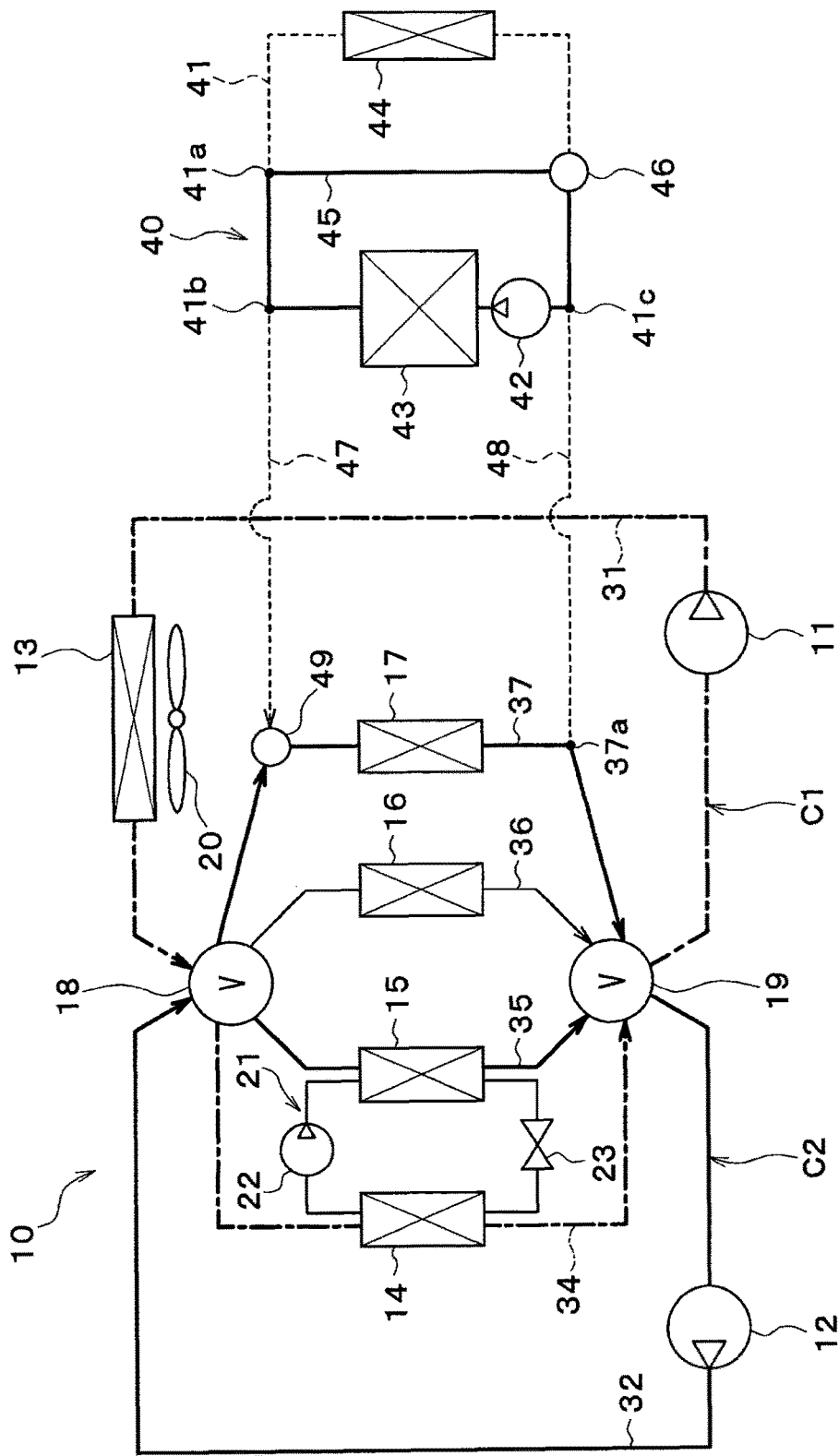
FIG. 5 is a schematic diagram illustrating a second operating mode in the vehicular thermal management system according to the first embodiment.

The second operating mode illustrated in FIG. 5 is implemented when the engine 43 is during operation, and the temperature of the coolant in the engine cooling circuit 40 is lower than a predetermined temperature.

In the second operating mode, as in the above first operating mode, the coolant cooler 14 is connected to the first cooling circuit C1, the coolant heater 15 and the heater core 17 are connected to the second cooling circuit C2, and the heater core 17 becomes in a state (disconnection mode) in which the heater core 17 is not connected to the engine cooling circuit 40.

In the second operating mode, the engine 43 is during operation, and the waste heat of the engine 43 is generated. However, since the coolant in the engine cooling circuit 40 does not flow into the heater core 17, the coolant in the engine cooling circuit 40 is not radiated by the heater core 17. For that reason, a rise in the temperature of the coolant in the engine cooling circuit 40 is promoted by the waste heat of the engine 43, and to warm up the engine 43 is further promoted.

Figure 6:
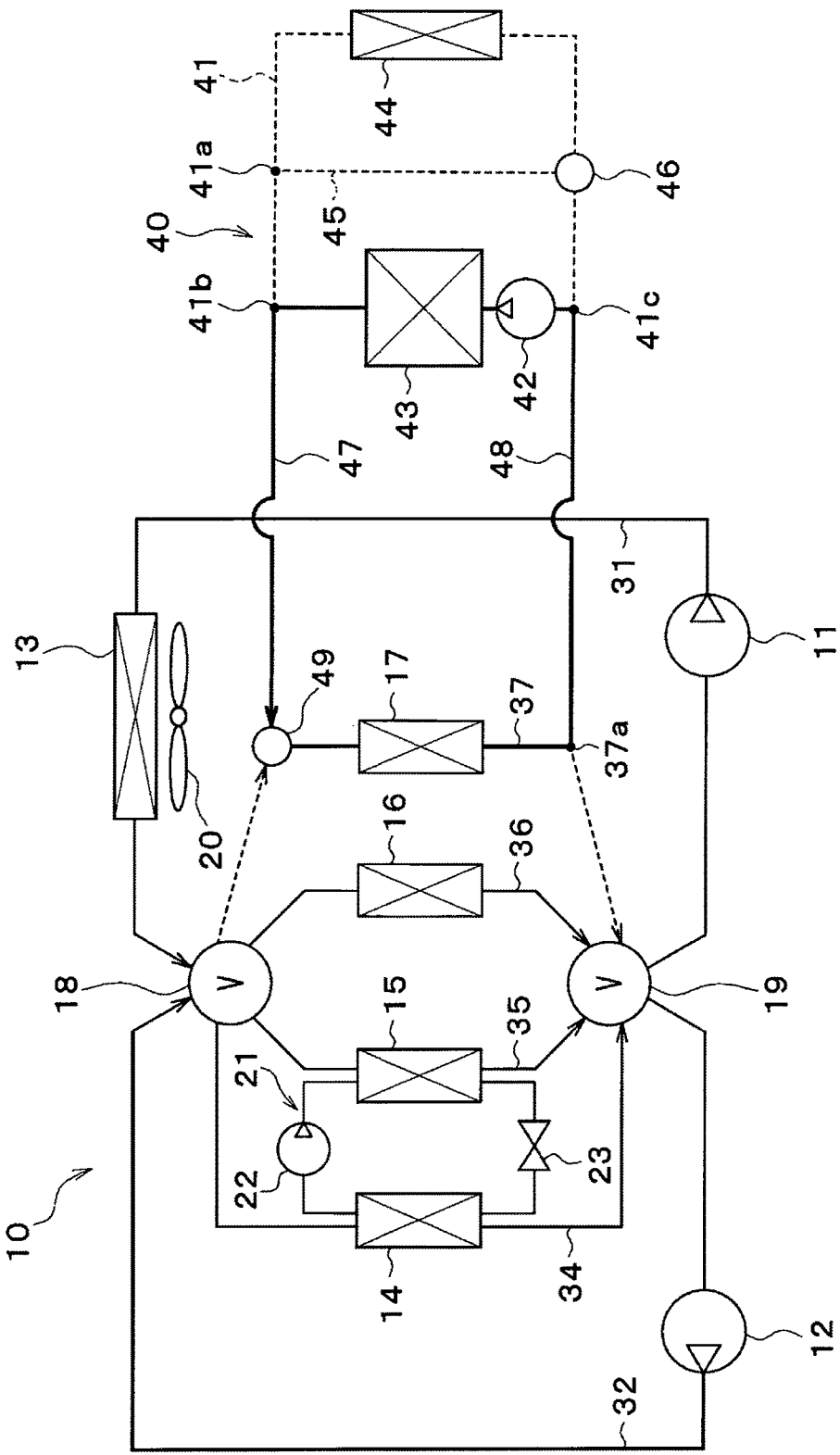
FIG. 6 is a schematic diagram illustrating a third operating mode in the vehicular thermal management system according to the first embodiment.

The third operating mode illustrated in FIG. 6 is implemented when the engine 43 is during operation, and the temperature of the coolant in the engine cooling circuit 40 is higher than a predetermined temperature. The third operating mode becomes a state (connection mode) in which the heater core 17 is not connected to the first cooling circuit C1 and the second cooling circuit C2, but connected to the engine cooling circuit 40.

In the third operating mode, since the coolant in the engine cooling circuit 40 flows into the heater core 17, the blast air to the vehicle interior can be heated in the heater core 17 with the use of the waste heat of the engine 43 for operating the heater.

Figure 7:
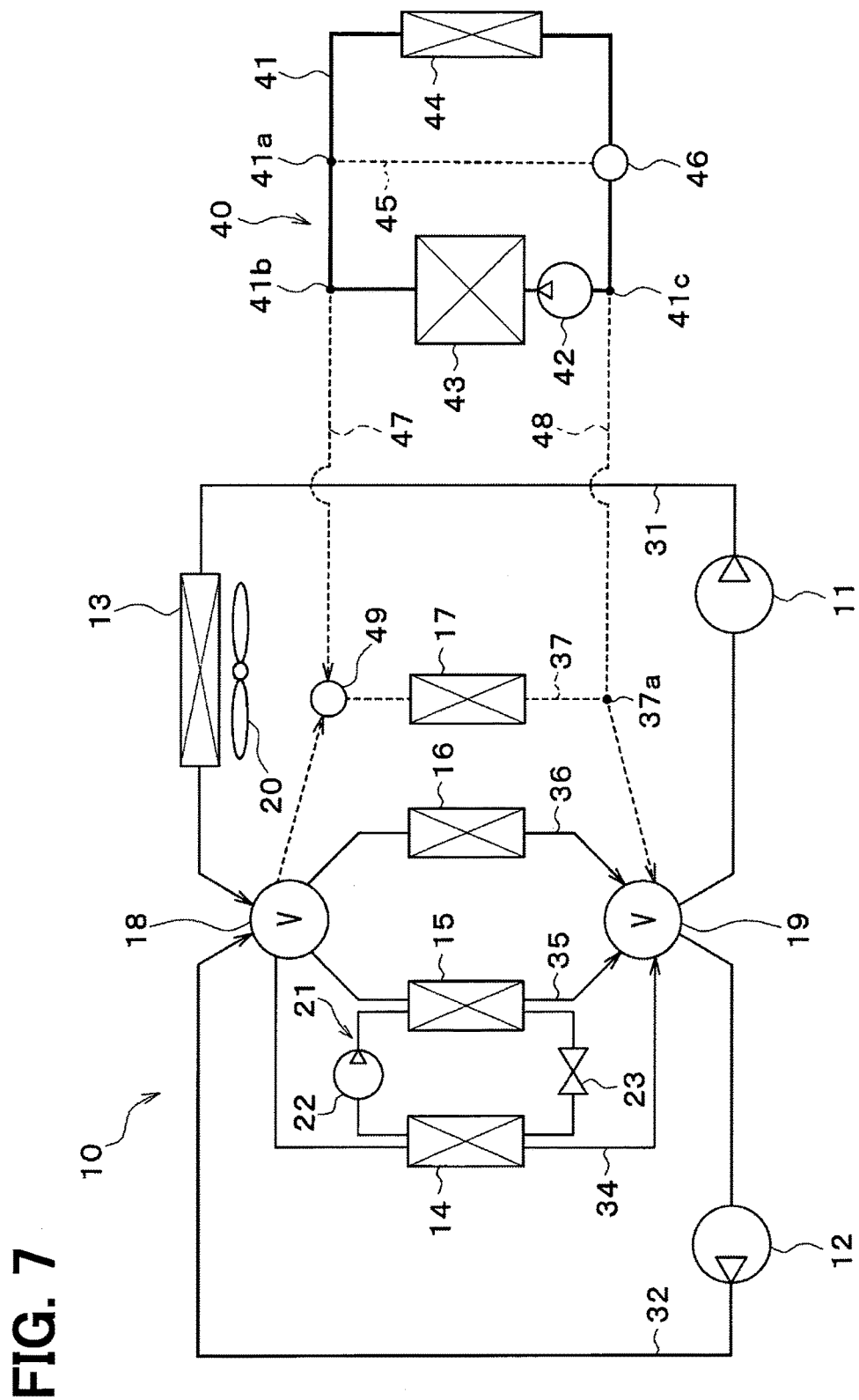
FIG. 7 is a schematic diagram illustrating a fourth operating mode in the vehicular thermal management system according to the first embodiment.

The fourth operating mode illustrated in FIG. 7 is implemented when a cooling load is high mainly in summer (for example, maximum cooling state). The fourth operating mode becomes a state (disconnection mode) in which the heater core 17 is not connected to the first cooling circuit C1, the second cooling circuit C2, and the engine cooling circuit 40. Specifically, at least one of the first switching valve 18 and the second switching valve 19 closes the heater core flow path 37, and the three-way valve 49 closes the first connection flow path 47 to realize the fourth operating mode.

In the fourth operating mode, since the coolant does not flow through the heater core 17, heat is not radiated in the heater core 17. For that reason, since a cold air cooled by the air cooler 53 is not wastefully heated by the heater core 17 within the casing 51 of the indoor air conditioning unit 50, the cooling efficiency can be enhanced.

The present applicant has previously proposed in Japanese Patent application No. 2012-278552 (hereinafter referred to as "earlier application example") to simplify a configuration of the vehicular thermal management system that is capable of switching a flow of coolant (heat medium) circulating through an equipment.

According to the earlier application example, a configuration is simple in that the equipment in which coolant flows, the first pump, and the second pump are connected in parallel with the first switching valve and the second switching valve. The simple configuration makes it possible to switch between a case in which the coolant drawn and discharged by the first pump circulates through the equipment and a case in which the coolant drawn and discharged by the second pump circulates through the equipment.

However, when the vehicular thermal management system in the above earlier application example is applied to a vehicle having an engine (heat generation equipment), since cooperation with an engine cooling circuit (heat medium circuit) in which the engine coolant (heat medium) circulates is not considered, the heat of the engine cannot be utilized by the heat utilization equipment connected to at least one of the first switching valve and the second switching valve.

For example, when the heater core (heat utilization equipment) that heats the coolant and the blast air to the vehicle interior is connected to at least one of the first switching valve and the second switching valve, the waste heat of the engine cannot be utilized for heating the vehicle interior.

Similarly, when the vehicular thermal management system in the above earlier application example is applied to the vehicle having a fuel cell (heat generation equipment), since cooperation with a fuel cell cooling circuit (heat medium circuit) is not considered, the waste heat of the fuel cell cannot be utilized by the heat utilization equipment connected to at least one of the first switching valve and the second switching valve.

On the other hand, according to the present embodiment, with the simple configuration in that the coolant circulation equipments 13, 14, 15, and 16 are connected between the first switching valve 18 and the second switching valve 19, a flow of the coolant circulating through the coolant circulation equipments 13, 14, 15, and 16 can be switched.

Further, in the present embodiment, the heater core 17 is connected to at least one of the first switching valve 18 and the second switching valve 19, and the engine cooling circuit 40. The three-way valve 49 switches between a state in which the coolant drawn and discharged by one of the first pump 11 and the second pump 12 circulates through the heater core 17 and a state in which the coolant drawn and discharged by the third pump 42 circulates through the heater core 17.

According to the above configuration, since the heat medium circulates between the heater core 17 and the engine 43, the waste heat of the engine 43 can be utilized in the heater core 17.

In the present embodiment, as in the second operating mode illustrated in FIG. 5, when the coolant drawn and discharged by one of the first pump 11 and the second pump 12 circulates through the heater core 17, the three-way valve 49 blocks the coolant drawn and discharged by the third pump 42 from circulating through the heater core 17.

As a result, when the coolant drawn and discharged by one of the first pump 11 and the second pump 12 circulates through the heater core 17, the coolant drawn and discharged by one of the first pump 11 and the second pump 12 can be prevented from being mixed with the coolant drawn and discharged by the third pump 42.

In the present embodiment, as in the third operating mode illustrated in FIG. 6, when the coolant drawn and discharged by the third pump 42 circulates through the heater core 17, one (at least one switching valve) of the first switching valve 18 and the second switching valve 19, which is connected with the heater core 17, blocks the coolant drawn and discharged by the first pump 11 and the coolant drawn and discharged by the second pump 12 from circulating through the heater core 17.

As a result, when the coolant drawn and discharged by the third pump 42 circulates through the heater core 17, the coolant drawn and discharged by the first pump 11 and the coolant drawn and discharged by the second pump 12 can be prevented from being mixed with the coolant drawn and discharged by the third pump 42.

The three-way valve 49 may be disposed between one (at least one switching valve) of the first switching valve 18 and the second switching valve 19, which is connected with the heater core 17, and the heater core 17 in a flow of the coolant.

In other words, in the case employing the configuration in which the heater core 17 is connected to the first switching valve 18 and the second switching valve 19 as in the present embodiment, the three-way valve 49 may be disposed between the first switching valve 18 and the heater core 17, or may be disposed between the second switching valve 19 and the heater core 17, in the flow of coolant.

In the present embodiment, as in the fourth operating mode illustrated in FIG. 7, one (at least one switching valve) of the first switching valve 18 and the second switching valve 19, which is connected with the heater core 17, and the three-way valve 49 can switch to a state in which none of the coolant drawn and discharged by the first pump 11, the coolant drawn and discharged by the second pump 12, and the coolant drawn and discharged by the third pump 42 circulates through the heater core 17.

With the above configuration, the operating mode for stopping the utilization of heat in the heater core 17 can be implemented.

In the present embodiment, since the heater core 17 and the engine radiator 44 are arranged in parallel to each other in the flow of coolant in the engine cooling circuit 40, the heat (waste heat) generated by the engine 43 can be radiated to the outside air.

Second Embodiment

Figure 8:
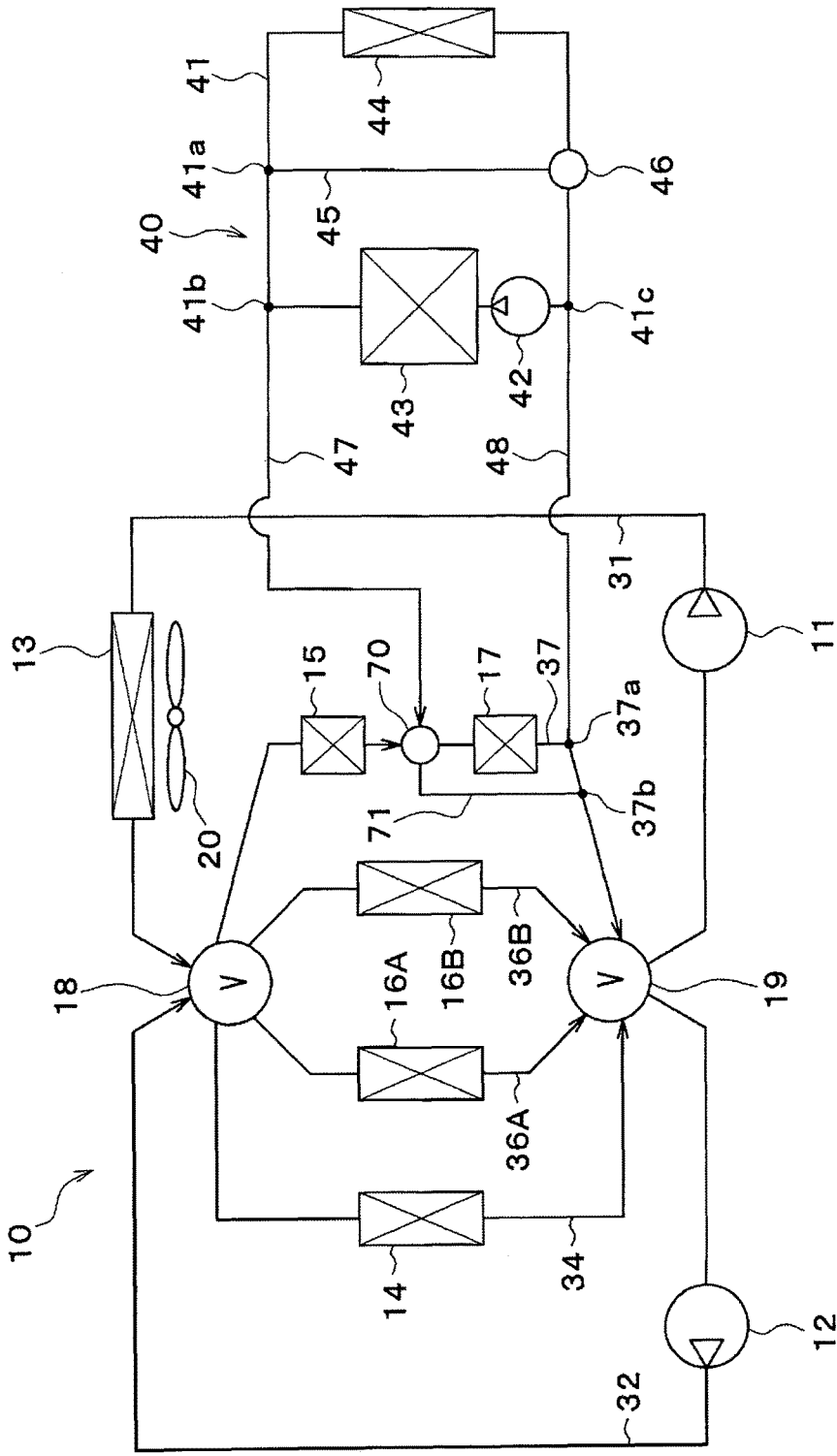
FIG. 8 is a schematic diagram illustrating a thermal management system for a vehicle, according to a second embodiment of the present disclosure.

In the above first embodiment, the coolant flows in parallel to the coolant heater 15 and the heater core 17. On the other hand, in a second embodiment, as illustrated in FIG. 8, the coolant flows in series with the coolant heater 15 and the heater core 17.

Specifically, the coolant heater 15 is disposed at a portion of a heater core flow path 37, which is located on a first switching valve 18 side (upstream side in a coolant flow) with respect to the heater core 17.

A first connection flow path 47 is connected to a portion of the heater core flow path 37 between the coolant heater 15 and the heater core 17. A four-way valve 70 is disposed in a connection portion between the heater core flow path 37 and the first connection flow path 47.

The four-way valve 70 is connected with one end of a heater core bypass passage 71. The heater core bypass passage 71 is a bypass passage in which the coolant of the heater core flow path 37 bypasses the heater core 17.

The other end of the heater core bypass passage 71 is connected to a portion 37b of the heater core flow path 37, which is located between a connection part 37a of the heater core flow path 37 and a second switching valve 19. The connection part 37a is connected with a second connection flow path 48. Therefore, the connection part 37b (merging part) between the heater core flow path 37 and the other end of the heater core bypass passage 71 is disposed on a downstream side of a connection part 37d (branch part) between the heater core flow path 37 and the second connection flow path 48 in the coolant flow.

Figure 9:
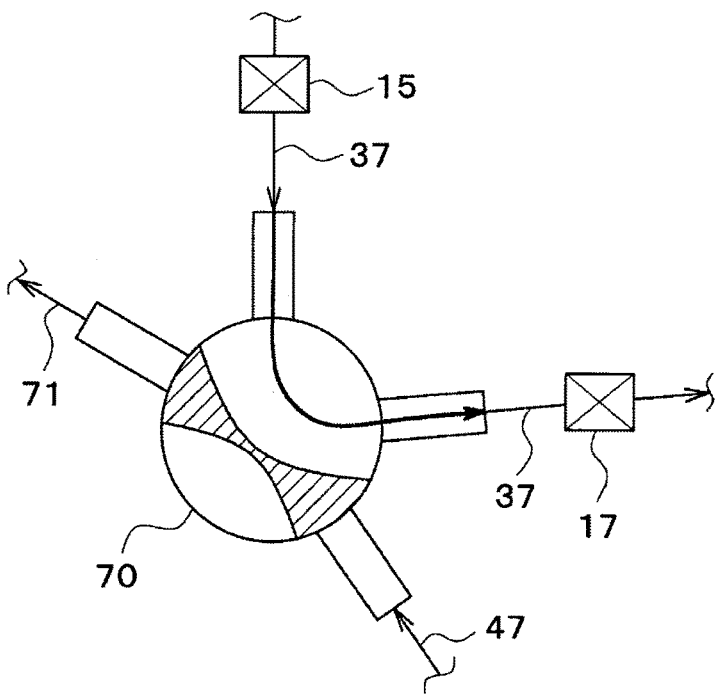
FIG. 9 is a schematic diagram illustrating a first switching state of a four-way valve according to the second embodiment.
Figure 10:
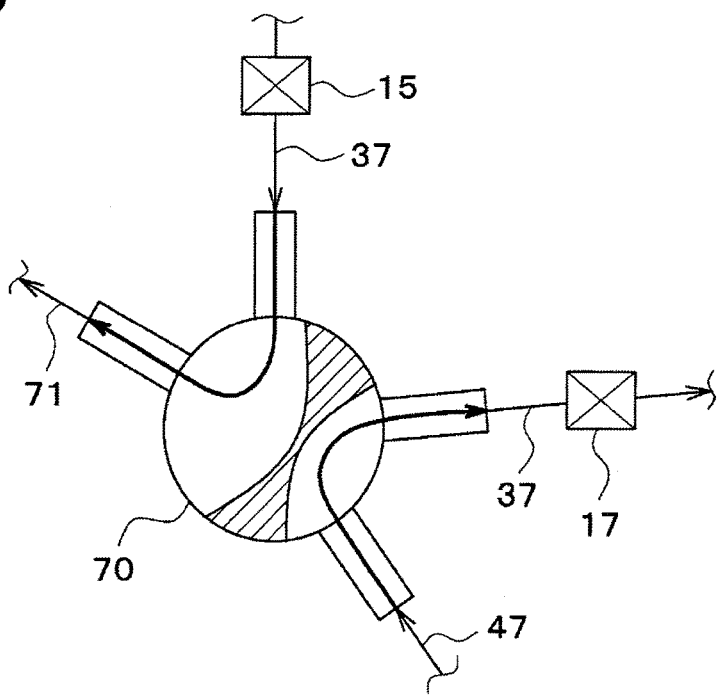
FIG. 10 is a schematic diagram illustrating a second switching state of the four-way valve according to the second embodiment.
Figure 11:
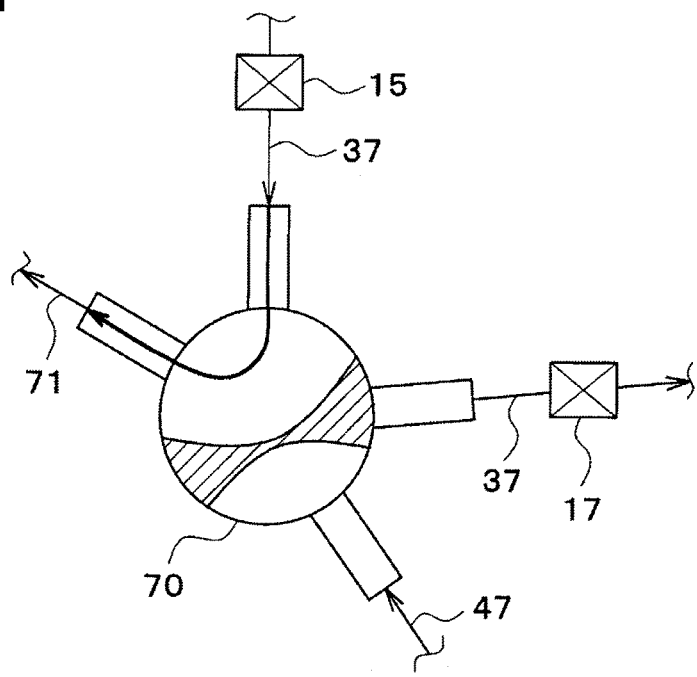
FIG. 11 is a schematic diagram illustrating a third switching state of the four-way valve according to the second embodiment.

The four-way valve 70 is an example of a switching device for switching to a refrigerant flow channel of a first switching state illustrated in FIG. 9, a refrigerant flow channel of a second switching state illustrated in FIG. 10, or a refrigerant flow channel of a third switching state illustrated in FIG. 11. The four-way valve 70 is formed of an electric valve mechanism.

In the first switching state illustrated in FIG. 9, the four-way valve 70 allows a communication of the heater core flow path 37 as it is, and also closes the first connection flow path 47 and the heater core bypass passage 71.

In the second switching state illustrated in FIG. 10, the four-way valve 70 connects a portion of the heater core flow path 37 on the coolant heater 15 side to the heater core bypass passage 71, and also connects a portion of the heater core flow path 37 on the heater core 17 side to the first connection flow path 47.

In the third switching state illustrated in FIG. 11, the four-way valve 70 connects a portion of the heater core flow path 37 on the coolant heater 15 side to the heater core bypass passage 71, and also closes a portion of the heater core flow path 37 on the heater core 17 side, and the first connection flow path 47.

Figure 12:
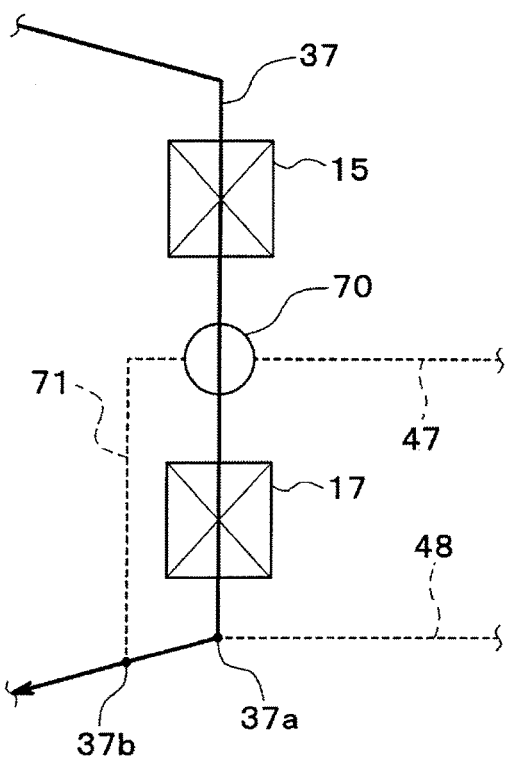
FIG. 12 is a schematic diagram illustrating a flow of coolant in the first switching state in the vehicular thermal management system according to the second embodiment.

When the four-way valve 70 switches to the first switching state, as illustrated in FIG. 12, the coolant passing through the coolant heater 15 flows in the heater core 17. As a result, the same operation as that in the first operating mode and the second operating mode in the first embodiment can be realized.

Moreover, since the coolant passing through the coolant heater 15 flows in series with the heater core 17, the amount of heat of the coolant heated by the coolant heater 15 can be efficiently utilized for operating the heater (that is, heating of the blast air to the vehicle interior).

Figure 13:
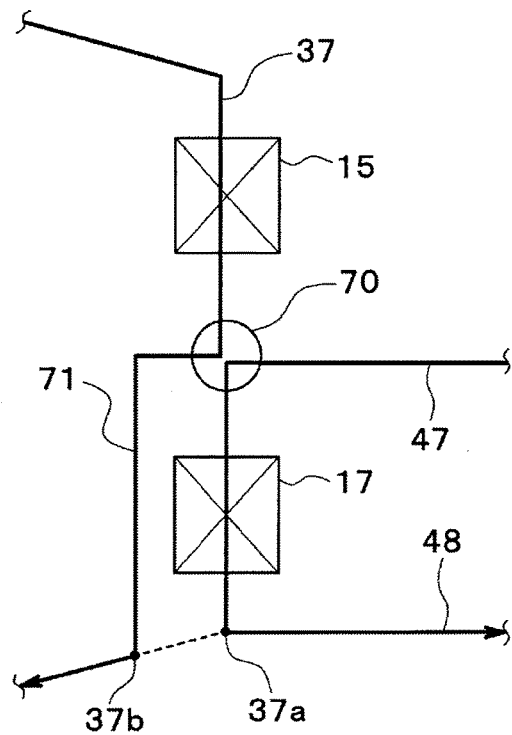
FIG. 13 is a schematic diagram illustrating a flow of coolant in the second switching state in the vehicular thermal management system according to the second embodiment.

When the four-way valve 70 switches to the second switching state, as illustrated in FIG. 13, the coolant passing through the coolant heater 15 bypasses the heater core 17, and flows into the second switching valve 19. The coolant in an engine cooling circuit 40 circulates through the heater core 17. With the above configuration, the same operation as that in the third operating mode in the first embodiment can be realized.

Figure 14:
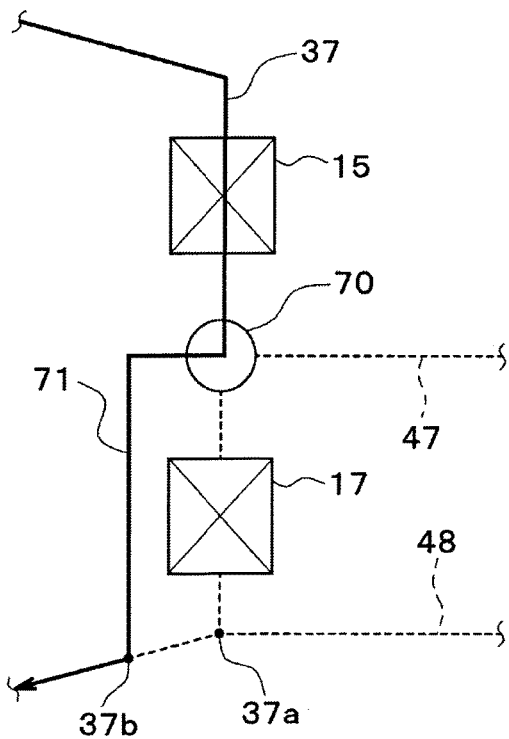
FIG. 14 is a schematic diagram illustrating a flow of coolant in the third switching state in the vehicular thermal management system according to the second embodiment.

When the four-way valve 70 switches to the third switching state, as illustrated in FIG. 14, the coolant passing through the coolant heater 15 bypasses the heater core 17, and flows into the second switching valve 19. The coolant does not flow in the heater core 17. With the above configuration, the same operation as that in the fourth operating mode in the first embodiment can be realized.

In the present embodiment, as illustrated in FIG. 8, a first temperature adjustment target equipment 16A and a second temperature adjustment target equipment 16B are disposed as temperature adjustment target equipments. The first temperature adjustment target equipment 16A is disposed in a first equipment flow path 36A. The second temperature adjustment target equipment 16B is disposed in a second equipment flow path 36B. The first equipment flow path 36A and the second equipment flow path 36B are connected to the first switching valve 18 and the second switching valve 19.

Similarly, in the present embodiment, the same effects as those in the above first embodiment can be obtained. In the present embodiment, as in the first switching state illustrated in FIGS. 9 and 12, when the coolant drawn and discharged by one of a first pump 11 and a second pump 12 circulates through the heater core 17, the four-way valve 70 blocks the coolant drawn and discharged by a third pump 42 from circulating through the heater core 17.

As a result, when the coolant drawn and discharged by one of the first pump 11 and the second pump 12 circulates through the heater core 17, the coolant drawn and discharged by one of the first pump 11 and the second pump 12 can be prevented from being mixed with the coolant drawn and discharged by the third pump 42.

In the present embodiment, as in the second switching state illustrated in FIGS. 10 and 13, when the coolant drawn and discharged by the third pump 42 circulates through the heater core 17, the four-way valve 70 blocks the coolant drawn and discharged by the first pump 11 and the coolant drawn and discharged by the second pump 12 from circulating through the heater core 17.

As a result, when the coolant drawn and discharged by the third pump 42 circulates through the heater core 17, the coolant drawn and discharged by the first pump 11 and the coolant drawn and discharged by the second pump 12 can be prevented from being mixed with the coolant drawn and discharged by the third pump 42.

In the present embodiment, since the coolant heater 15 is disposed in series with the heater core 17 and on the upstream side of the heater core 17 in the flow of coolant, the heat from the coolant heater 15 can be effectively utilized by the heater core 17.

In the present embodiment, the four-way valve 70 is disposed between the coolant heater 15 and the heater core 17 in the flow of coolant, and the heater core bypass passage 71 is connected to the four-way valve 70. The four-way valve 70 blocks a circulation of the coolant into the heater core bypass passage 71 when the coolant drawn and discharged by one of the first pump 11 and the second pump 12 circulates through the heater core 17 as in the first switching state illustrated in FIGS. 9 and 12. The four-way valve 70 circulates the coolant through the heater core bypass passage 71 when the coolant drawn and discharged by the third pump 42 circulates through the heater core 17 as in the second switching state illustrated in FIGS. 10 and 13.

With the above configuration, an operating mode for circulating the coolant drawn and discharged by one of the first pump 11 and the second pump 12 through the coolant heater 15 and the heater core 17, and an operating mode for circulating the coolant drawn and discharged by one of the first pump 11 and the second pump 12 in the coolant heater 15, and not circulating the coolant through the heater core 17 can be realized.

In the present embodiment, the heater core bypass passage 71 is connected to the connection part 37b of the heater core flow path 37 (a flow path of the coolant extending from the heater core 17 to one side of the first pump 11 and the second pump 12) on a downstream side of the branch part 37a toward the engine cooling circuit 40 side.

The above configuration makes it possible to restrain the coolant flowing in the heater core bypass passage 71 from flowing into the engine cooling circuit 40.

Third Embodiment

Figure 15:
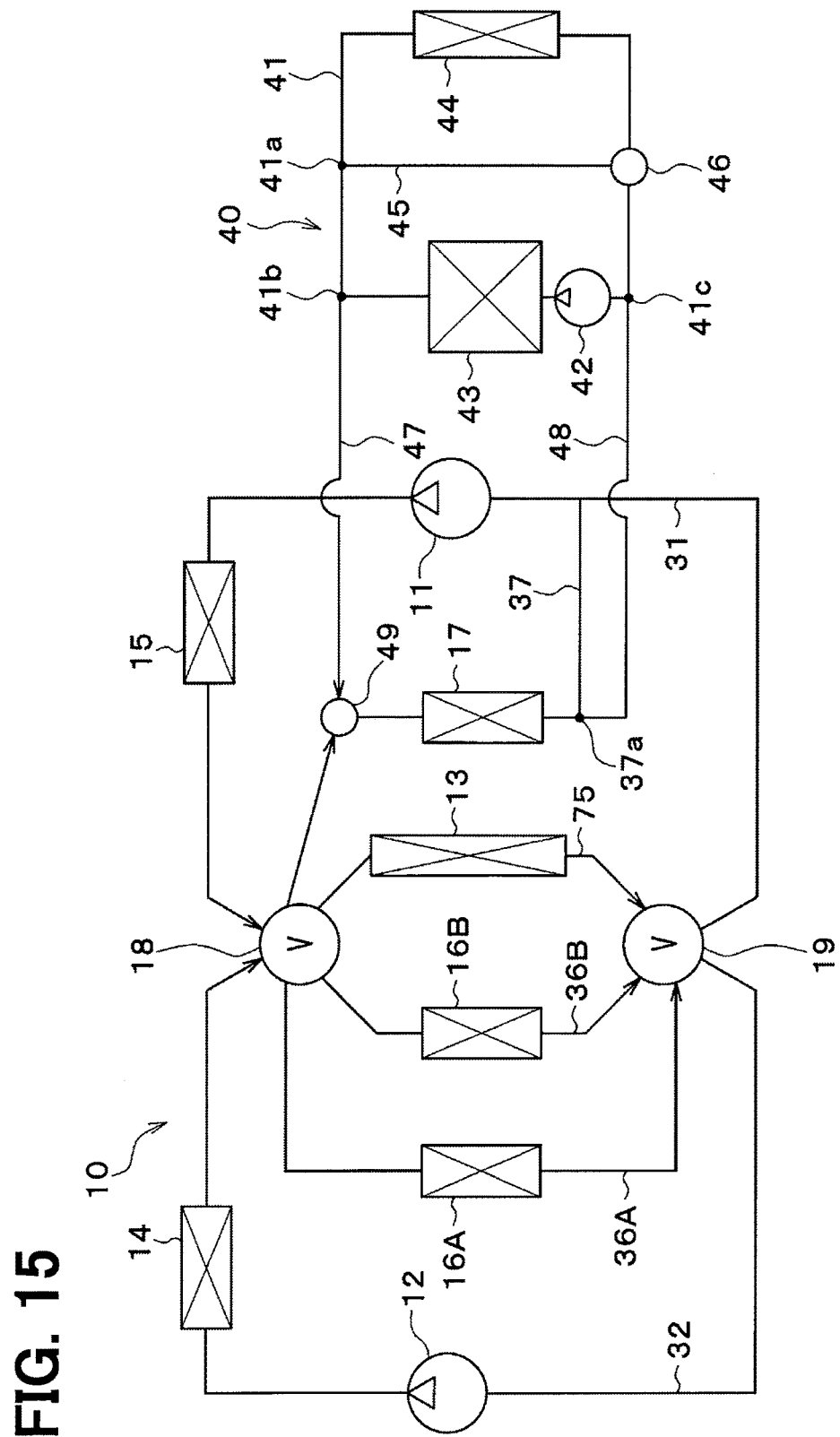
FIG. 15 is a schematic diagram illustrating a thermal management system for a vehicle, according to a third embodiment of the present disclosure.

In the above first embodiment, the downstream end of the heater core flow path 37 is connected to the second switching valve 19. In a third embodiment, as illustrated in FIG. 15, a downstream end of a heater core flow path 37 is connected to a portion of a first pump flow path 31 on an intake side of a first pump 11. In other words, the downstream end of the heater core flow path 37 is connected to a portion of the first pump flow path 31 between a second switching valve 19 and the first pump 11.

According to the present embodiment, since there is no need to provide an inlet for a heater core 17 in the second switching valve 19, a configuration of the second switching valve 19 can be simplified.

In the present embodiment, a coolant cooler 14 is disposed in a second pump flow path 32. A coolant heater 15 is disposed in the first pump flow path 31. A radiator 13 is disposed in a radiator flow path 75. The radiator flow path 75 is connected to a first switching valve 18 and the second switching valve 19.

In the present embodiment, a first temperature adjustment target equipment 16A and a second temperature adjustment target equipment 16B are disposed as temperature adjustment target equipments. The first temperature adjustment target equipment 16A is disposed in a first equipment flow path 36A. The second temperature adjustment target equipment 16B is disposed in a second equipment flow path 36B. The first equipment flow path 36A and the second temperature adjustment target equipment 16B are connected to the first switching valve 18 and the second switching valve 19.

Fourth Embodiment

Figure 16:
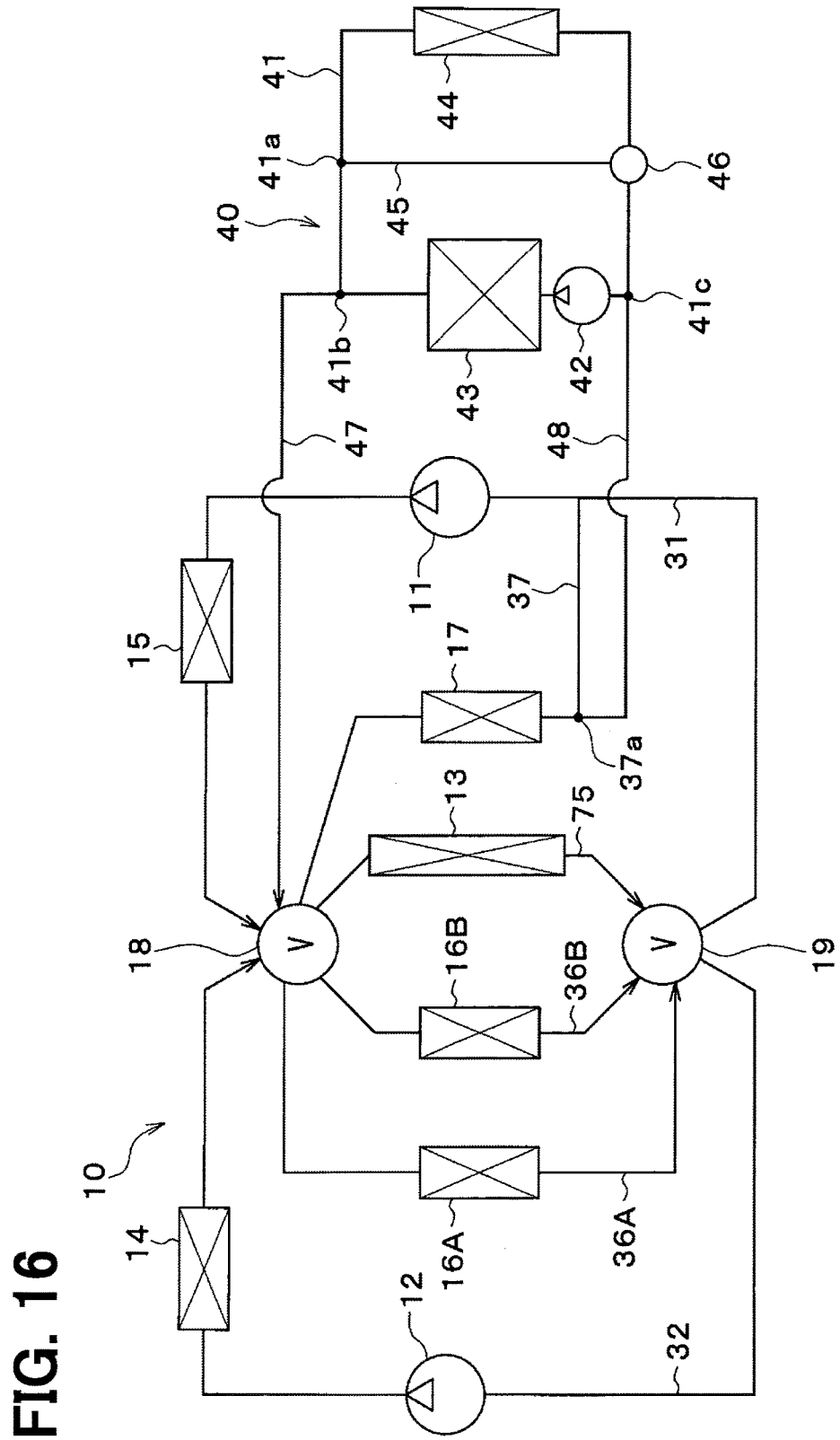
FIG. 16 is a schematic diagram illustrating a thermal management system for a vehicle, according to a fourth embodiment of the present disclosure.

In the above third embodiment, the downstream end of the first connection flow path 47 is connected to the heater core flow path 37 through the three-way valve 49. In a fourth embodiment, as illustrated in FIG. 16, a downstream end of a first connection flow path 47 is connected to a first switching valve 18. In other words, an engine cooling circuit 40 is connected to the first switching valve 18.

The first switching valve 18 is capable of switching between a state (connection mode) in which the first connection flow path 47 communicates with a heater core flow path 37 and a state (disconnection mode) in which the first connection flow path 47 does not communicate with the heater core flow path 37.

According to the present embodiment, the first switching valve 18 is capable of functioning as the three-way valve 49 (switching device) in the third embodiment. In other words, the three-way valve 49 in the third embodiment can be integrated with the first switching valve 18. For that reason, a configuration of a thermal management system 10 can be simplified.

The engine cooling circuit 40 may be connected to a second switching valve 19. In other words, when the engine cooling circuit 40 is connected to at least one of the first switching valve 18 and the second switching valve 19, and when a switching valve (at least one switching valve) among the first switching valve 18 and the second switching valve 19, which is connected with the engine cooling circuit 40, configures a switching device that switches a flow of a heat medium circulating through a heater core 17, a configuration of the thermal management system 10 can be simplified.

Fifth Embodiment

Figure 17:
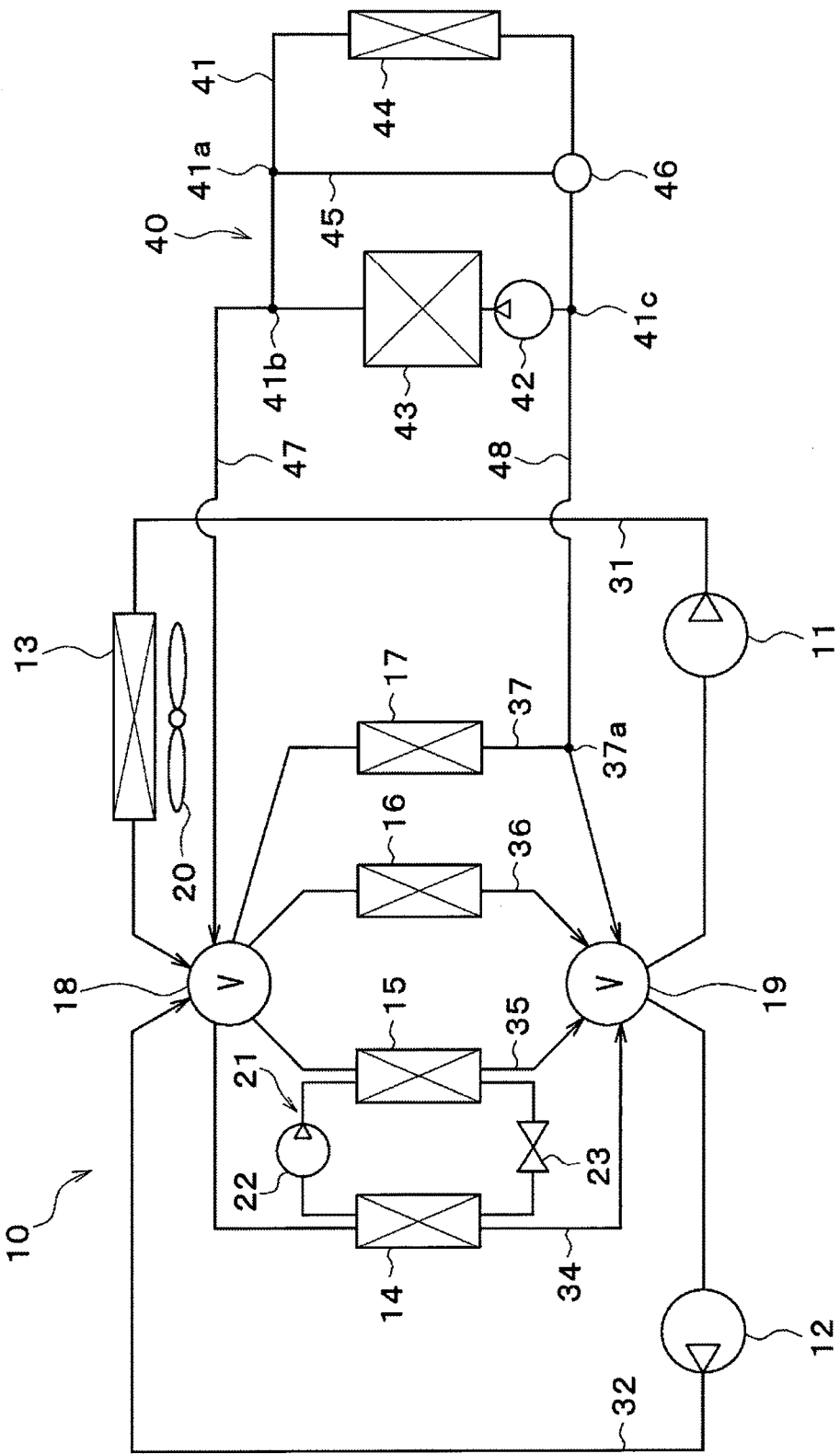
FIG. 17 is a schematic diagram illustrating a thermal management system for a vehicle, according to a fifth embodiment of the present disclosure.

In the above fourth embodiment, on the assumption of the configuration of the third embodiment, the three-way valve 49 is integrated with the first switching valve 18. In a fifth embodiment, as illustrated in FIG. 17, on the assumption of the configuration of the first embodiment, a three-way valve 49 is integrated with a first switching valve 18.

Specifically, in the above fourth embodiment, the downstream end of the heater core flow path 37 is connected to the first pump flow path 31. In the present embodiment, a downstream end of a heater core flow path 37 is connected to a second switching valve 19.

As in the above fourth embodiment, a downstream end of a first connection flow path 47 is connected to the first switching valve 18. The first switching valve 18 is capable of switching between a state (connection mode) in which the first connection flow path 47 communicates with the heater core flow path 37 and a state (disconnection mode) in which the first connection flow path 47 does not communicate with the heater core flow path 37.

Similarly, in the present embodiment, the same effects as those in the above fourth embodiment can be obtained.

Sixth Embodiment

Figure 18:
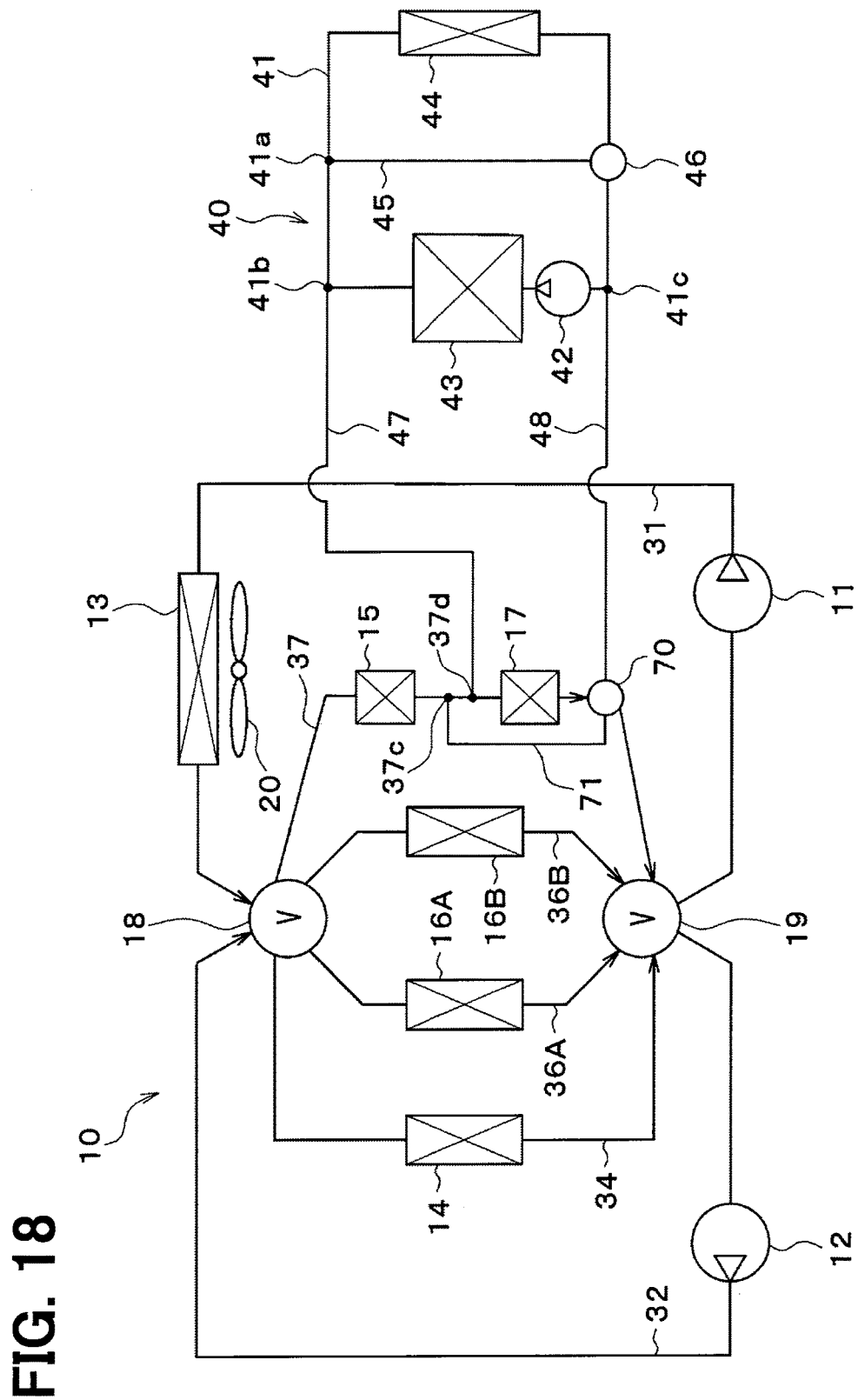
FIG. 18 is a schematic diagram illustrating a thermal management system for a vehicle, according to a sixth embodiment of the present disclosure.

In the above second embodiment, the four-way valve 70 is disposed in the connection part between the heater core flow path 37 and the first connection flow path 47. In a sixth embodiment, as illustrated in FIG. 18, a four-way valve 70 is disposed in a connection part between a heater core flow path 37 and a second connection flow path 48.

An upstream end of a heater core bypass passage 71 is connected to a portion 37c of the heater core flow path 37 between a coolant heater 15 and a heater core 17. In the heater core flow path 37, a connection part 37c (branch part) with the upstream end of the heater core bypass passage 71 is disposed on an upstream side of a connection part 37d (merging part) with a first connection flow path 47 in a coolant flow. A downstream end of the heater core bypass passage 71 is connected to the four-way valve 70.

Similarly, in the present embodiment, the same effects as those in the above second embodiment can be obtained.

Seventh Embodiment

Figure 19:
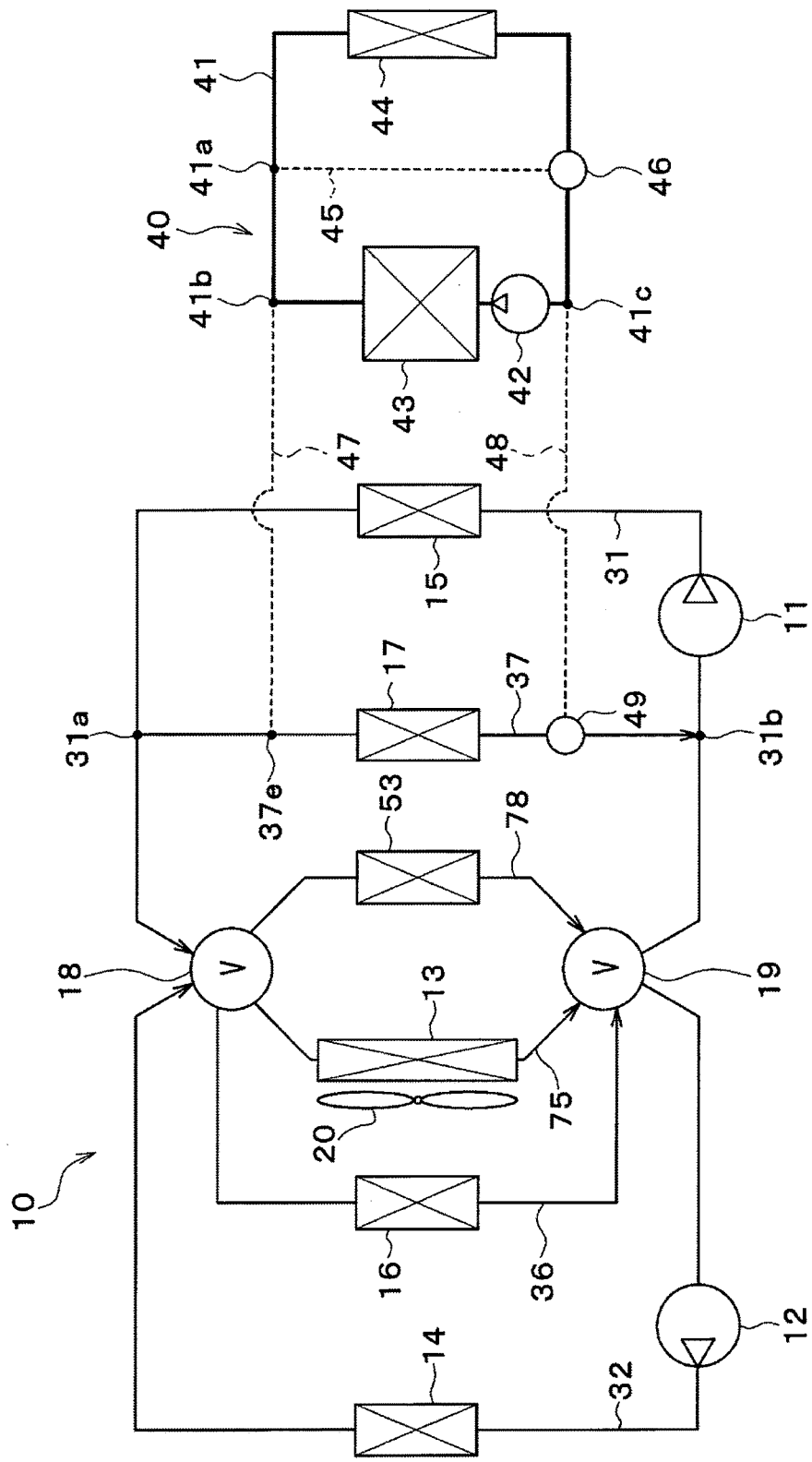
FIG. 19 is a schematic diagram illustrating a thermal management system for a vehicle, according to a seventh embodiment of the present disclosure.

In the present embodiment, as illustrated in FIG. 19, an arrangement of a coolant cooler 14, a coolant heater 15, and a three-way valve 49, and a connection destination of a heater core flow path 37 are changed as compared with the above first embodiment.

The coolant cooler 14 is disposed on a discharge side of a second pump 12 in a second pump flow path 32. The coolant heater 15 is disposed on a discharge side of a first pump 11 in a first pump flow path 31.

One end of the heater core flow path 37 is connected to a portion 31a of the first pump flow path 31 on a coolant outlet side of the coolant heater 15. A connection part 31a between the first pump flow path 31 and one end of the heater core flow path 37 is an example of a branch part at which the coolant flowing out of the coolant heater 15 branches to a first switching valve 18 side and a heater core 17 side. In other words, the connection part 31a is disposed in a coolant passage between an outflow side of the coolant heater 15 connected to a discharge side of the first pump 11 and the first switching valve 18, and connected to the heater core 17.

The other end of the heater core flow path 37 is connected to a portion 31b of the first pump flow path 31 on a coolant intake side of the first pump 11. A connection part 31b between the first pump flow path 31 and the other end of the heater core flow path 37 is an example of a merging part at which the coolant flowing out of a second switching valve 19 and the coolant flowing out of the heater core 17 are merged together. In other words, the connection part 31b is disposed in a coolant passage between the second switching valve and the intake side of the first pump 11, and connected to the heater core 17.

The three-way valve 49 is disposed in a connection part between the heater core flow path 37 and a second connection flow path 48. A connection part 37e between the heater core flow path 37 and a first connection flow path 47 configures a merging part of an engine cooling circuit 40.

In the present embodiment, a flow of the coolant circulated by the first pump 11 branches to the first switching valve 18 side and the heater core 17 side in the branch part 31a, and the coolant flowing out of the second switching valve 19 and the coolant flowing out of the heater core 17 are merged together in the merging part 31b. Therefore, the same operating mode as that in the first embodiment can be realized.

In the present embodiment, a cooler core 53 (air cooler) is disposed in an air cooler flow path 78. The air cooler flow path 78 is connected to the first switching valve 18 and the second switching valve 19.

The cooler core 53 is a cooling heat exchanger that exchanges heat between the blast air to the vehicle interior and the coolant to cool the air blown into the vehicle interior. In other words, the cooler core 53 is an example of the heat utilization equipment (second heat utilization equipment) utilizing the heat of the coolant.

As illustrated in FIG. 2, the air cooler 53 is disposed on the upstream side of the air flow of the heater core 17 within a casing 51 of an indoor air conditioning unit 50.

The first switching valve 18 switches the cooler core 53 to a state in which the coolant discharged from the first pump 11 flows therein, a state in which the coolant discharged from the second pump 12 flows therein, or a state in which the coolant discharged from the first pump 11 and the coolant discharged from the second pump 12 do not flow therein.

The second switching valve 19 switches the cooler core 53 to a state in which the coolant flows into the first pump 11, a state in which the coolant flows into the second pump 12, or a state in which the coolant does not flow into the first pump 11 and the second pump 12.

Eighth Embodiment

Figure 20:
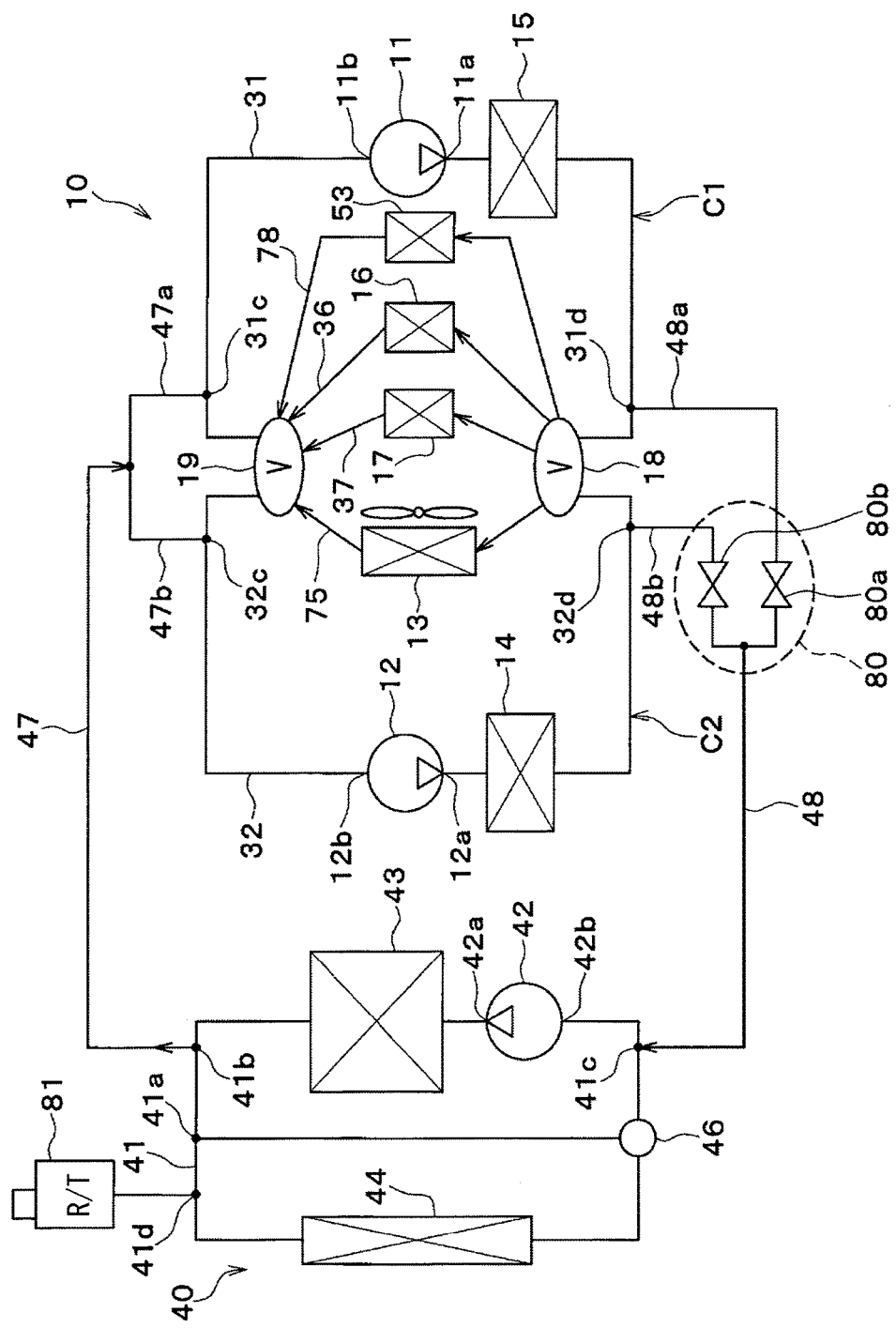
FIG. 20 is a schematic diagram illustrating a thermal management system for a vehicle, according to an eighth embodiment of the present disclosure.

In the present embodiment, as illustrated in FIG. 20, connection destinations of a first connection flow path 47 and a second connection flow path 48 change as compared with the above first embodiment.

In the present embodiment, a coolant cooler 14 is disposed on a discharge side of a second pump 12 in a second pump flow path 32. A coolant heater 15 is disposed on a discharge side of a first pump 11 in a first pump flow path 31. A radiator 13 is disposed in a radiator flow path 75. The radiator flow path 75 is connected to a first switching valve 18 and a second switching valve 19.

In the present embodiment, as in the seventh embodiment, a cooler core 53 is disposed in an air cooler flow path 78, and the air cooler flow path 78 is connected to the first switching valve 18 and the second switching valve 19.

The first connection flow path 47 is an example of a first communication portion that communicates an engine cooling circuit 40 with a first cooling circuit C1 and a second cooling circuit C2.

One end of the first connection flow path 47 is connected to a portion 41b of a circulation flow path 41, which is located on a coolant discharge side (coolant outlet side of an engine 43 in an example of FIG. 20) of a third pump 42, and a coolant inlet side of an engine radiator 44.

In other words, one end of the first connection flow path 47 is connected to a portion of the engine cooling circuit 40 in which a pressure of the coolant has the same level as that of a pressure of the coolant in the engine radiator 44, and has the same level as that of a pressure adjusted by a reserve tank 81.

One end of the first connection flow path 47 may be connected to a portion of the engine cooling circuit 40 in which the pressure of the coolant is higher than an average pressure of the engine cooling circuit 40. The average pressure of the engine cooling circuit 40 means an average pressure of the pump discharge pressure and the pump intake pressure in the engine cooling circuit 40.

The pump discharge pressure in the engine cooling circuit 40 means a pressure of the coolant in a coolant discharge port 42a of the third pump 42. The pump intake pressure in the engine cooling circuit 40 means a pressure of the coolant in a coolant intake port 42b of the third pump 42.

The other end of the first connection flow path 47 branches to a branch flow channel 47a toward the first pump flow path 31 and a branch flow channel 47b toward the second pump flow path 32.

The branch flow channel 47a on the first pump flow path 31 side is connected to a portion 31c of the first pump flow path 31 which is located on the intake side of the first pump 11. The branch flow channel 47b on the second pump flow path 32 side is connected to a portion 32c of the second pump flow path 32 which is located on the intake side of the second pump 12.

The branch flow channel 47a on the first pump flow path 31 side is disposed on a portion of the first cooling circuit C1 in which a pressure of the coolant is lower than a pressure of the coolant in an equipment connected to the first cooling circuit C1. The equipment connected to the first cooling circuit C1 is at least one equipment of the radiator 13, a temperature adjustment target equipment 16, the cooler core 53, and a heater core 17.

The branch flow channel 47a on the first pump flow path 31 side may be connected to a portion of the first cooling circuit C1 in which a pressure of the coolant is lower than an average pressure of the first cooling circuit C1. The average pressure of the first cooling circuit C1 means an average pressure of the pump discharge pressure and the pump intake pressure in the first cooling circuit C1.

The pump discharge pressure in the first cooling circuit C1 means a pressure of the coolant in a coolant discharge port 11a of the first pump 11. The pump intake pressure in the first cooling circuit C1 means a pressure of the coolant in a coolant intake port 11b of the first pump 11.

The branch flow channel 47b on the second pump flow path 32 side is disposed in a portion of the second cooling circuit C2 in which a pressure of the coolant is lower than a pressure of the coolant in an equipment connected to the second cooling circuit C2. The equipment connected to the second cooling circuit C2 is at least one equipment of the radiator 13, the temperature adjustment target equipment 16, the cooler core 53, and the heater core 17.

The branch flow channel 47b on the second pump flow path 32 side may be connected to a portion of the second cooling circuit C2 in which a pressure of the coolant is lower than an average pressure of the second cooling circuit C2. The average pressure of the second cooling circuit C2 means an average pressure of the pump discharge pressure and the pump intake pressure in the second cooling circuit C2.

The pump discharge pressure in the second cooling circuit C2 means a pressure of the coolant in a coolant discharge port 12a of the second pump 12. The pump intake pressure in the second cooling circuit C2 means a pressure of the coolant in a coolant intake port 12b of the second pump 12.

The second connection flow path 48 is an example of a second communication portion that communicates the engine cooling circuit 40 with the first cooling circuit C1 and the second cooling circuit C2.

One end of the second connection flow path 48 is connected to a portion 41c of the circulation flow path 41 which is located on a coolant outlet side of the engine radiator 44 and an intake side of the third pump 42.

In other words, one end of the second connection flow path 48 is connected to a portion of the engine cooling circuit 40 in which a pressure of the coolant is lower than a pressure of the coolant in the engine radiator 44.

One end of the second connection flow path 48 may be connected to a portion of the engine cooling circuit 40 in which a pressure of the coolant is lower than an average pressure of the engine cooling circuit 40.

The other end of the second connection flow path 48 branches to a branch flow channel 48a toward the first pump flow path 31 and a branch flow channel 48b toward the second pump flow path 32.

The branch flow channel 48a on the first pump flow path 31 side is connected to a portion 31d of the first pump flow path 31 which is located on the discharge side of the first pump 11. The branch flow channel 48b on the second pump flow path 32 side is connected to a portion 32d of the second pump flow path 32 which is located on the discharge side of the second pump 12.

The branch flow channel 48a on the first pump flow path 31 side is disposed on a portion of the first cooling circuit C1 in which a pressure of the coolant is higher than a pressure of the coolant in an equipment connected to the first cooling circuit C1. The equipment connected to the first cooling circuit C1 is at least one equipment of the radiator 13, the temperature adjustment target equipment 16, the cooler core 53, and the heater core 17.

The branch flow channel 48a on the first pump flow path 31 side may be connected to a portion of the first cooling circuit C1 in which a pressure of the coolant is higher than an average pressure of the first cooling circuit C1.

The branch flow channel 48b on the second pump flow path 32 side is disposed in a portion of the second cooling circuit C2 in which a pressure of the coolant is higher than a pressure of the coolant in an equipment connected to the second cooling circuit C2. The equipment connected to the second cooling circuit C2 is at least one equipment of the radiator 13, the temperature adjustment target equipment 16, the cooler core 53, and the heater core 17.

The branch flow channel 48b on the second pump flow path 32 side may be connected to a portion of the second cooling circuit C2 in which a pressure of the coolant is higher than an average pressure of the second cooling circuit C2.

The engine cooling circuit 40 is connected in series with the first pump flow path 31 and the second pump flow path 32 by the first connection flow path 47 and the second connection flow path 48.

A flow rate adjustment valve 80 is disposed in the second connection flow path 48. The flow rate adjustment valve 80 includes a first flow rate adjustment valve 80a disposed in the branch flow channel 48a on the first pump flow path 31 side, and a second flow rate adjustment valve 80b disposed in the branch flow channel 48b on the second pump flow path 32 side.

Each of the first flow rate adjustment valve 80a and the second flow rate adjustment valve 80b includes a valve body having a changeable valve opening, and an electric actuator that drives the valve body. The operation of the first flow rate adjustment valve 80a and the second flow rate adjustment valve 80b is controlled by the control device 60 (FIG. 3).

The first flow rate adjustment valve 80a is first flow rate adjustment means for adjusting a flow rate of the coolant in the branch flow channel 48a on the first pump flow path 31 side. The second flow rate adjustment valve 80b is second flow rate adjustment means for adjusting a flow rate of the coolant in the branch flow channel 48b on the second pump flow path 32 side.

The first flow rate adjustment valve 80a is a narrowed part that narrows the branch flow channel 48a on the first pump flow path 31 side. The second flow rate adjustment valve 80b is a narrowed part that narrows the branch flow channel 48b on the second pump flow path 32 side.

The first flow rate adjustment valve 80a is open/close means for opening and closing the branch flow channel 48a on the first pump flow path 31 side. The second flow rate adjustment valve 80b is open/close means for opening and closing the branch flow channel 48b on the second pump flow path 32 side.

Each of the first flow rate adjustment valve 80a and the second flow rate adjustment valve 80b may be configured by means having a mode for fully opening a flow path and a mode for fully closing the flow path, for narrowing a flow rate by periodically repeating the fully opening mode and the fully closing mode.

The flow rate adjustment valve 80 is an example of a switching device that switches to a state in which the coolant drawn and discharged by the first pump 11 circulates through the heater core 17, a state in which the coolant drawn and discharged by the second pump 12 circulates through the heater core 17, or a state in which the coolant drawn and discharged by the third pump 42 circulates through the heater core 17.

When the coolant drawn and discharged by the first pump 11 or the second pump 12 circulates through the heater core 17, the flow rate adjustment valve 80 blocks the coolant drawn and discharged by the third pump 42 from circulating through the heater core 17.

The reserve tank 81 is disposed in a portion 41d of the circulation flow path 41 which is located on a coolant outlet side of the engine 43 and on a coolant inlet side of the engine radiator 44. The reserve tank 81 is disposed in a portion of the engine cooling circuit 40 in which a pressure of the coolant is higher than an average pressure of the engine cooling circuit 40.

The reserve tank 81 is an example of a sealed pressure adjustment device having a function of holding an appropriate pressure against an abnormal increase or decrease of the pressure caused by expansion and contraction associated with a change in the temperature of the coolant. The sealed reserve tank 81 has a pressure adjustment valve, and the pressure of the coolant in the reserve tank 81 is adjusted within a pressure range set by the pressure adjustment valve.

The reserve tank 81 may be configured by an atmospheric open pressure adjustment device. When the reserve tank 81 is of the atmospheric open type, the pressure of the coolant in the reserve tank 81 is the same as the atmospheric pressure.

With an excessive coolant reserved in the reserve tank 81, a reduction in the amount of coolant circulating through the respective flow paths can be suppressed.

The reserve tank 81 has a function of separating air bubbles mixed in the coolant. When the reserve tank 81 is of the sealed type, the pressure adjustment valve of the reserve tank 81 is opened to discharge the air bubbles to the external.

Figure 21:
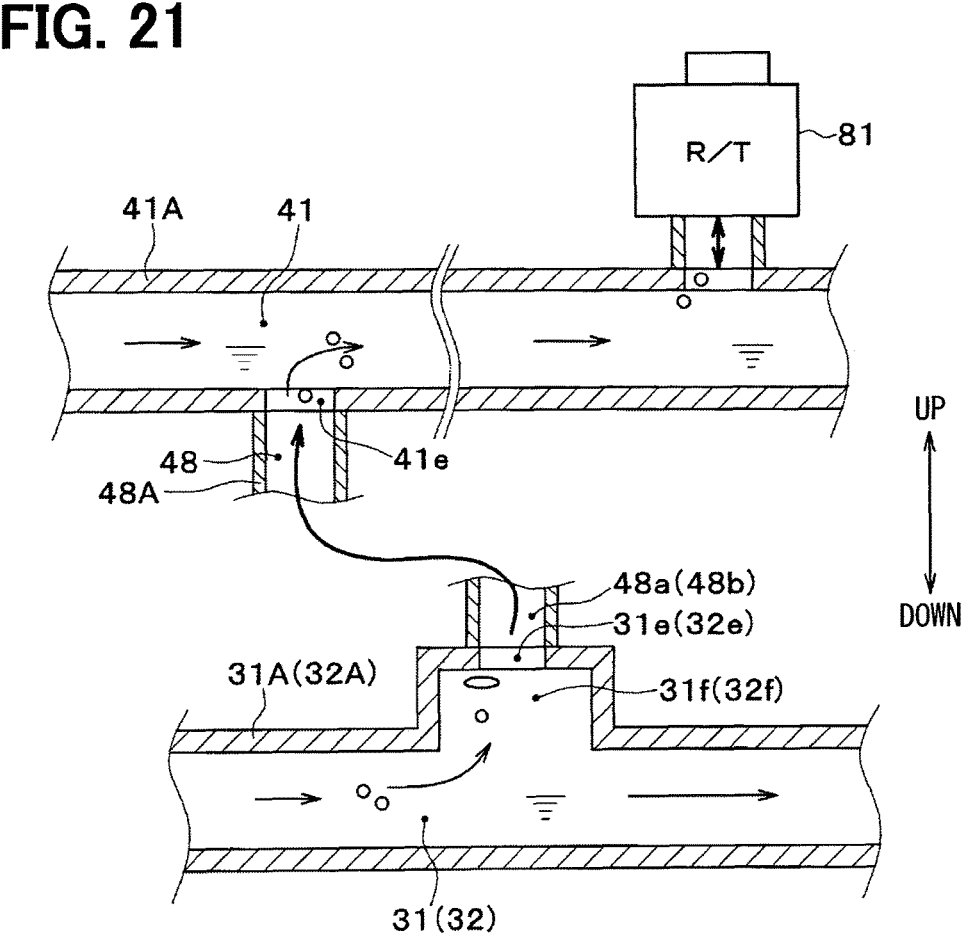
FIG. 21 is a schematic cross-sectional diagram illustrating a flow path connection configuration in the vehicular thermal management system according to the eighth embodiment.

FIG. 21 is a schematic view illustrating a connection structure between the branch flow channel 48a of the second connection flow path 48 on the first pump flow path 31 side, and the circulation flow path 41 and the first pump flow path 31. A connection structure between the branch flow channel 48b on the second pump flow path 32 side, and the circulation flow path 41 and the second pump flow path 32 is identical with the connection structure illustrated in FIG. 21, and therefore symbols corresponding to the branch flow channel 48b on the second pump flow path 32 side and the second pump flow path 32 are noted in brackets in FIG. 21.

In FIG. 21, upper and lower arrows denote a vertical direction in the gravity direction. A pipe 48A forming the second connection flow path 48 extends in the gravity direction as a whole.

The branch flow channel 48a of the second connection flow path 48 on the first pump flow path 31 side extends from the first pump flow path 31 toward an upper side in the gravity direction. Therefore, a pipe 31A forming the first pump flow path 31 has a portion in which a communication hole 31e that communicates with the branch flow channel 48a on the first pump flow path 31 side is opened toward the upper side in the gravity direction. Even if a center axis of an opening of the communication hole 31e is oriented in a lateral direction (horizontal direction) to the gravity direction, a part of an opening area of the opening of the communication hole 31e may be oriented upward.

The pipe 31A forming the first pump flow path 31 forms a bubble capture part 31f that captures air bubbles in the vicinity of the communication hole 31e.

An end of the second connection flow path 48 on the circulation flow path 41 side extends toward the upper side in the gravity direction, and is connected to the circulation flow path 41. Therefore, a pipe 41A forming the circulation flow path 41 has a portion in which a communication hole 41e that communicates with the second connection flow path 48 is opened toward the lower side in the gravity direction. Even if a center axis of an opening of the communication hole 41e is oriented in a lateral direction (horizontal direction) to the gravity direction, a part of an opening area of the opening of the communication hole 41e may be oriented upward.

The branch flow channel 48b of the second connection flow path 48 on the second pump flow path 32 side extends from the second pump flow path 32 toward the upper side in the gravity direction. Therefore, a pipe 32A forming the second pump flow path 32 has a communication hole 32e opened toward the upper side in the gravity direction. The communication hole 32e communicates with the branch flow channel 48b on the second pump flow path 32 side.

The pipe 32A forming the second pump flow path 32 forms a bubble capture part 32f that captures air bubbles in the vicinity of the communication hole 32e.

In the present embodiment, with the control of valve opening of the first flow rate adjustment valve 80a and the second flow rate adjustment valve 80b, the engine cooling circuit 40 can be made to arbitrarily communicate with the first cooling circuit C1 and the second cooling circuit C2.

When the engine cooling circuit 40 communicates with the second cooling circuit C2 (cooling circuit having the coolant cooler 14), the coolant in the engine cooling circuit 40 flows into the coolant cooler 14. Therefore, in the coolant cooler 14, the refrigerant in a refrigeration cycle 21 absorbs heat from the coolant in an engine cooling circuit 40. Accordingly, a heat pump operation for pumping the waste heat of the engine 43 can be realized.

Since the coolant in the engine cooling circuit 40 has a temperature higher than an outside air temperature, the pressure (temperature) of the refrigerant evaporated in the coolant cooler 14 can increase, and the power consumption of a compressor 22 can be further reduced, as compared with the heat pump operation that pumps the heat of the outside air.

In the heat pump operation that pumps the heat of the outside air, when the temperature of the outside air is extremely low, the heat absorption cannot be performed without any extreme reduction in the refrigerant pressure, and a desired heating capacity is not obtained. Under the above condition, the heating COP is deteriorated, and the power saving effect of the heat pump is not obtained.

On the contrary, in the heat pump operation for pumping the waste heat of the engine 43, since heat absorption can be performed without any reduction in the refrigerant pressure even if the temperature of the outside air is extremely low, a sufficient heating capacity can be obtained.

When the coolant in the engine cooling circuit 40 flows into the heater core 17 to operate the heater, the sufficient heating capacity cannot be obtained if the temperature of the coolant in the engine cooling circuit 40 is lower than the discharge temperature (for example, 50° C.) at which an occupant obtains satisfactory heating feeling.

On the contrary, in the heat pump operation for pumping the waste heat of the engine 43, the sufficient heating capacity can be obtained even if the temperature of the coolant in the engine cooling circuit 40 is lower than the discharge temperature (for example, 50° C.) at which the occupant obtains satisfactory heating feeling.

For that reason, as compared with a case in which the coolant in the engine cooling circuit 40 flows directly into the heater core 17 to operate the heater, since the engine 43 can be restrained from being operated for only heating to heat the coolant in the engine cooling circuit 40, a fuel consumption during heating can be reduced.

Further, the coolant in the engine cooling circuit 40 also flows directly into a cooler core 16B (second temperature adjustment target equipment) disposed windward of the heater core 17 whereby a temperature of the blown air flowing into the heater core 17 is increased by the cooler core 16B in advance. Then, the heat pump operation for pumping the waste heat of the engine 43 by the amount of heat for heating air to the discharge temperature at which the occupant obtains the satisfactory heating feeling can be realized. For that reason, since a work load of the compressor 22 required for the heat pump operation can be reduced, the power consumption of the compressor 22 can be reduced, and the fuel consumption during heating can be further reduced.

When the temperature of the coolant in the engine cooling circuit 40 is higher than the discharge temperature (for example, 50° C.) at which the occupant obtains the satisfactory heating feeling, for example, when the engine 43 is operated for traveling, the first switching valve 18, the second switching valve 19, the first flow rate adjustment valve 80a, and the second flow rate adjustment valve 80b are controlled so that the coolant in the engine cooling circuit 40 flows into the heater core 17. As a result, the air blown into the vehicle interior can be heated directly by the coolant of the engine cooling circuit 40 in the heater core 17. For that reason, even if the compressor 22 stops, heater can be operated.

In the present embodiment, since the reserve tank 81 is located in the engine cooling circuit 40, the pressure of the coolant in the engine cooling circuit 40 is adjusted by the reserve tank 81.

The first connection flow path 47 communicates portions (pump intake side portions) of the first cooling circuit C1 and the second cooling circuit C2 in which a pressure of the coolant is lower with a portion (pump discharge side portion) of the engine cooling circuit 40 in which a pressure of the coolant is higher.

According to the above configuration, as compared with a case in which the first connection flow path 47 communicates the portions (pump intake side portions) of the first cooling circuit C1 and the second cooling circuit C2 in which the pressure of the coolant is lower with the portion (pump intake side portion) of the engine cooling circuit 40 in which the pressure of the coolant is lower, the pressure of the coolant in the first cooling circuit C1 and the second cooling circuit C2 can be increased.

For that reason, the pressures of the coolant in the first cooling circuit C1 and the second cooling circuit C2 can be prevented from becoming negative to generate cavitation, and the coolant pipes can be prevented from being crushed to increase a pressure loss.

In the present embodiment, one reserve tank 81 is located in the engine cooling circuit 40, and no reserve tank 81 is located in the first cooling circuit C1 and the second cooling circuit C2.

Therefore, when the engine cooling circuit 40 is connected to the first cooling circuit C1 or the second cooling circuit C2 to form one cooling circuit, only one reserve tank 81 is located within the cooling circuit connected into one piece.

Now, let us consider a case in which multiple sealed reserve tanks 81 are located within the cooling circuit connected into one piece. In that case, valves of only a part of the multiple reserve tanks 81 may be opened, and valves of the remaining reserve tanks 81 may not be opened.

In the reserve tank 81 whose valve is not opened, air bubbles separated from the coolant cannot be discharged to the external, and the air bubbles are stored. Therefore, an overall interior of the reserve tank 81 is eventually filled with air, and the function of the reserve tank 81 is not achieved. For that reason, only one sealed reserve tank 81 needs to be located within the cooling circuit connected into one piece.

In view of the above, in the present embodiment, since only one reserve tank 81 is located within the cooling circuit connected into one piece, the valve of the sealed reserve tank 81 can be surely opened, and the air bubbles can be surely discharged to the external.

The pipes 31A and 32A forming the pump flow paths 31 and 32 have the communication holes 31e and 32e opened toward the upper side in the gravity direction, respectively. The communication holes 31e and 32e communicate with the branch flow channels 48a and 48b of the second connection flow path 48. The branch flow channels 48a and 48b of the second connection flow path 48 extend from the pump flow paths 31 and 32 toward the upper side in the gravity direction.

According to the above configuration, the air bubbles mixed into the coolant of the pump flow paths 31 and 32 can be easily led to the second connection flow path 48.

Since the pipes forming the pump flow paths 31 and 32 form the bubble capture parts 31f and 32f capturing the air bubbles in the vicinity of the communication holes 31e and 32e, the air bubbles mixed into the coolant of the pump flow paths 31 and 32 can be more easily led to the second connection flow path 48.

The pipe 41A forming the circulation flow path 41 has the communication hole 41e opened toward the lower side in the gravity direction. The communication hole 41e communicates with the second connection flow path 48. An end of the second connection flow path 48 on the circulation flow path 41 side extends toward the upper side in the gravity direction, and is connected to the circulation flow path 41.

For that reason, since the air bubbles led to the second connection flow path 48 from the pump flow paths 31 and 32 can be easily led to the reserve tank 81, the air bubbles can be discharged from the reserve tank 81.

The reserve tank 81 may be disposed in any one of the first cooling circuit C1, the second cooling circuit C2, and the engine cooling circuit 40.

The first connection flow path 47 and the second connection flow path 48 may communicate one of the first cooling circuit C1, the second cooling circuit C2, and the cooling circuit 40 in which the reserve tank 81 is provided with the respective remaining circuits (respective circuits having no reserve tank 81).

The first connection flow path 47 may communicate a portion of the circuit having the reserve tank 81 in which a pressure of the coolant is higher than a first average pressure with the respective remaining circuits. The first average pressure means an average pressure of the pump discharge pressure and the pump intake pressure in the circuit having the reserve tank 81.

According to the above configuration, the coolant pressures of the three cooling circuits including the first cooling circuit C1, the second cooling circuit C2, and the engine cooling circuit 40 can be adjusted by one reserve tank 81.

Moreover, as compared with a case in which the first connection flow path 47 communicates a portion of the circuit having the reserve tank 81 in which a pressure of the coolant is lower than the first average pressure with the respective remaining circuits, the pressures of the coolant in the respective remaining circuits can be increased.

For that reason, the pressures of the coolant in the respective remaining circuits can be prevented from becoming negative to generate cavitation, and the coolant pipes can be prevented from being crushed to increase a pressure loss.

The first connection flow path 47 may communicate the circuit having the reserve tank 81 with portions of the respective remaining circuits C1 and C2 in which a pressure of the coolant is lower than a second average pressure. The second average pressure means an average pressure of the pump discharge pressure and the pump intake pressure in the respective remaining circuits C1 and C2.

According to the above configuration, as compared with a case in which the first connection flow path 47 communicates the circuit having the reserve tank 81 with portions of the respective remaining circuits C1 and C2 in which a pressure of the coolant is higher than the second average pressure, the pressures of the coolant in the respective remaining circuits can be increased.

For that reason, the pressures of the coolant in the respective remaining circuits can be prevented from becoming negative to generate cavitation, and the coolant pipes can be prevented from being crushed to increase a pressure loss.

If the communication holes having an opening area oriented toward the upper side in the gravity direction are defined in portions of the respective remaining circuits C1 and C2, which are connected to the second connection flow path 48, the air bubbles mixed into the coolant of the respective remaining circuits C1 and C2 can be easily led to the second connection flow path 48.

In the present embodiment, the first connection flow path 47 and the second connection flow path 48 form the branch flow channels 47a, 47b, and 48a, 48b branched toward the respective remaining circuits C1 and C2. That configuration can communicate the engine cooling circuit 40 with both of the first cooling circuit C1 and the second cooling circuit C2.

In the present embodiment, the flow rate adjustment valve 80 switches to a state in which the coolant drawn and discharged by one of the first pump 11 and the second pump 12 circulates through the heater core 17, a state in which the coolant drawn and discharged by the other pump of the first pump 11 and the second pump 12 circulates through the heater core 17, or a state in which the coolant drawn and discharged by the third pump 42 circulates through the heater core 17.

When the coolant drawn and discharged by one of the first pump 11 and the second pump 12 circulates through the heater core 17, the flow rate adjustment valve 80 blocks the coolant drawn and discharged by the third pump 42 from circulating through the heater core 17.

When the coolant drawn and discharged by the other of the first pump 11 and the second pump 12 circulates through the heater core 17, the flow rate adjustment valve 80 blocks the coolant drawn and discharged by the third pump 42 from circulating through the heater core 17.

According to the above configuration, when the coolant drawn and discharged by one of the first pump 11 and the second pump 12 circulates through the heater core 17, the coolant drawn and discharged by one of the first pump 11 and the second pump 12 can be prevented from being mixed with the coolant drawn and discharged by the third pump 42.

Further, when the coolant drawn and discharged by the other of the first pump 11 and the second pump 12 circulates through the heater core 17, the coolant drawn and discharged by the other of the first pump 11 and the second pump 12 can be prevented from being mixed with the coolant drawn and discharged by the third pump 42.

In the present embodiment, when the coolant drawn and discharged by the first pump 11 circulates through the heater core 17, the flow rate adjustment valve 80 circulates the coolant drawn and discharged by the third pump 42 through the coolant cooler 14 and the cooler core 53.

With the above configuration, an operating mode for absorbing the waste heat of the engine 43 by the coolant cooler 14, and utilizing the waste heat of the engine 43 by the cooler core 53 can be realized.

Ninth Embodiment

Figure 22:
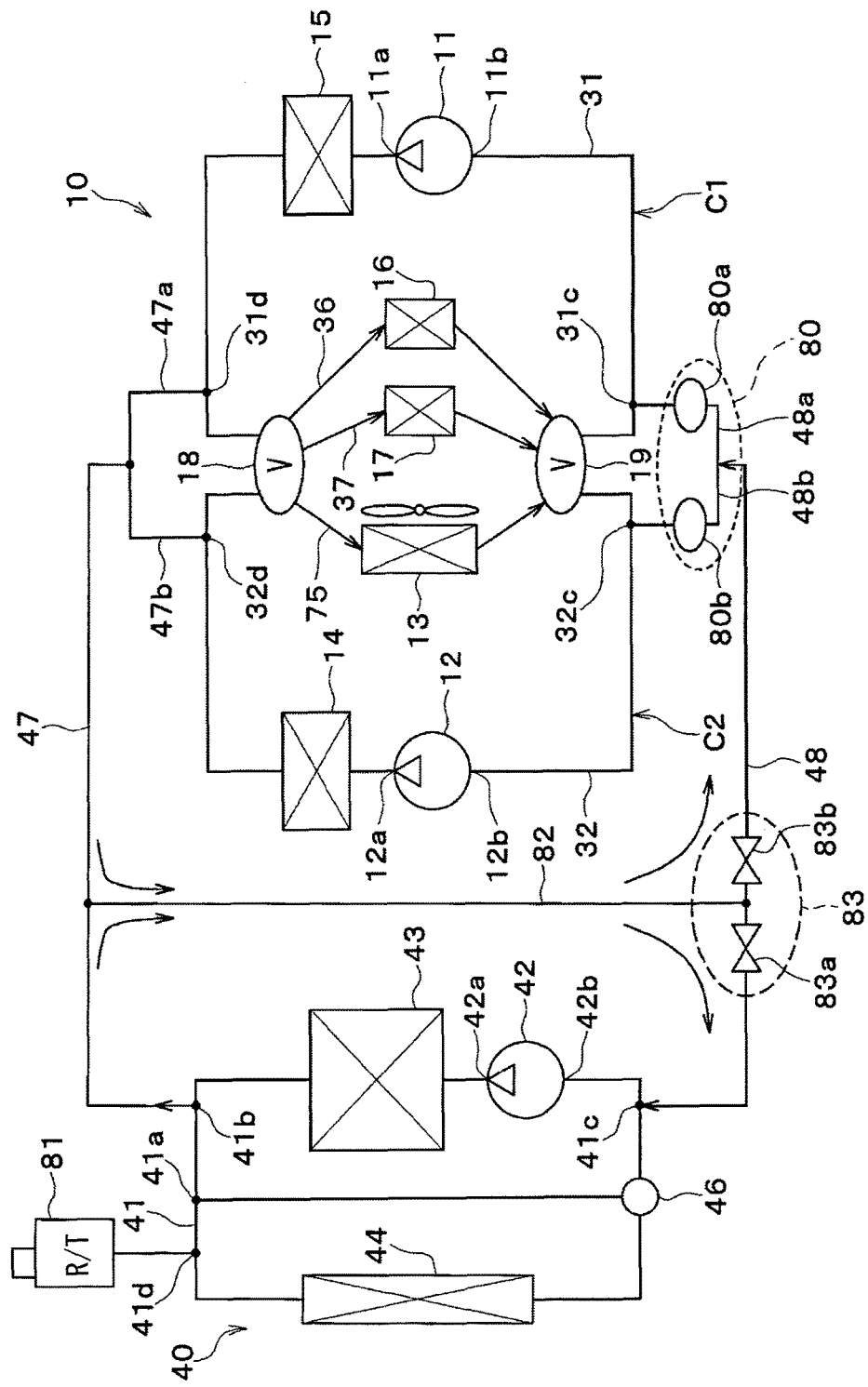
FIG. 22 is a schematic diagram illustrating a thermal management system for a vehicle, according to a ninth embodiment of the present disclosure.

In the above eighth embodiment, the engine cooling circuit 40 is connected in series with the first pump flow path 31 and the second pump flow path 32. In the present embodiment, as illustrated in FIG. 22, an engine cooling circuit 40 is connected in parallel to a first pump flow path 31 and a second pump flow path 32.

A branch flow channel 47a of a first connection flow path 47 on the first pump flow path 31 side is connected to a portion 31d of the first pump flow path 31 which is located on the discharge side of a first pump 11. A branch flow channel 47b of the first connection flow path 47 on the second pump flow path 32 side is connected to a portion 32d of the second pump flow path 32 which is located on the discharge side of a second pump 12.

The branch flow channel 47a on the first pump flow path 31 side is disposed on a portion of a first cooling circuit C1 in which a pressure of the coolant is higher than a pressure of the coolant in an equipment connected to the first cooling circuit C1. The equipment connected to the first cooling circuit C1 is at least one equipment of a radiator 13, a temperature adjustment target equipment 16, and a heater core 17.

The branch flow channel 47a on the first pump flow path 31 side may be connected to a portion of the first cooling circuit C1 in which a pressure of the coolant is higher than an average pressure of the first cooling circuit C1.

The branch flow channel 47b on the second pump flow path 32 side is disposed in a portion of a second cooling circuit C2 in which a pressure of the coolant is higher than a pressure of the coolant in an equipment connected to the second cooling circuit C2. The equipment connected to the second cooling circuit C2 is at least one equipment of the radiator 13, the temperature adjustment target equipment 16, and the heater core 17.

The branch flow channel 47b on the second pump flow path 32 side may be connected to a portion of the second cooling circuit C2 in which a pressure of the coolant is higher than an average pressure of the second cooling circuit C2.

A branch flow channel 48a of a second connection flow path 48 on the first pump flow path 31 side is connected to a portion 31c of the first pump flow path 31 which is located on the intake side of the first pump 11. A branch flow channel 48b of the second connection flow path 48 on the second pump flow path 32 side is connected to a portion 32c of the second pump flow path 32 which is located on the intake side of the second pump 12.

The branch flow channel 48a on the first pump flow path 31 side is disposed on a portion of the first cooling circuit C1 in which a pressure of the coolant is lower than a pressure of the coolant in an equipment connected to the first cooling circuit C1. The equipment connected to the first cooling circuit C1 is at least one equipment of the radiator 13, the temperature adjustment target equipment 16, and the heater core 17.

The branch flow channel 48a on the first pump flow path 31 side may be connected to a portion of the first cooling circuit C1 in which a pressure of the coolant is lower than an average pressure of the first cooling circuit C1.

The branch flow channel 48b on the second pump flow path 32 side is disposed in a portion of the second cooling circuit C2 in which a pressure of the coolant is lower than a pressure of the coolant in an equipment connected to the second cooling circuit C2. The equipment connected to the second cooling circuit C2 is at least one equipment of the radiator 13, the temperature adjustment target equipment 16, and the heater core 17.

The branch flow channel 48b on the second pump flow path 32 side may be connected to a portion of the second cooling circuit C2 in which a pressure of the coolant is lower than an average pressure of the second cooling circuit C2.

A mixing flow channel 82 is an example of a third communication portion that communicates a portion of the first connection flow path 47 except for the branch flow channels 47a and 47b with a portion of the second connection flow path 48 except for the branch flow channels 48a and 48b.

With the above configuration, as indicated by arrows in FIG. 22, the coolant in the engine cooling circuit 40 and the coolant in the first cooling circuit C1 and the second cooling circuit C2 flow into the mixing flow path 82 through the first connection flow path 47. The coolant mixed in the mixing flow path 82 is branched to the engine cooling circuit 40 side, and the first cooling circuit C1 and the second cooling circuit C2 side through the second connection flow path 48, and refluxed.

A throttle valve 83 is disposed in the second connection flow path 48. The throttle valve 83 has a first throttle valve 83a and a second throttle valve 83b.

The first throttle valve 83a is disposed on a portion of the second connection flow path 48 on the engine cooling circuit 40 side with respect to a connection part of the second connection flow path 48 with the mixing flow path 82. The first throttle valve 83a is a variable throttle mechanism having a valve body having a changeable throttle opening and an actuator that changes the throttle opening of the valve body. The actuator is an electric actuator or a mechanical actuator using a spring pressure. The first throttle valve 83a throttles the flow path to increase the pressure loss, thereby preventing a reverse flow of the coolant.

The second throttle valve 83b is disposed on a portion of the second connection flow path 48 on the first pump flow path 31 and the second pump flow path 32 side with respect to a connection part of the second connection flow path 48 with the mixing flow path 82. The second throttle valve 83b is a variable throttle mechanism having a valve body having a changeable throttle opening and an actuator that changes the throttle opening of the valve body. The actuator is an electric actuator or a mechanical actuator using a spring pressure. The second throttle valve 83b throttles the flow path to increase the pressure loss, thereby preventing a reverse flow of the coolant.

Figure 3:
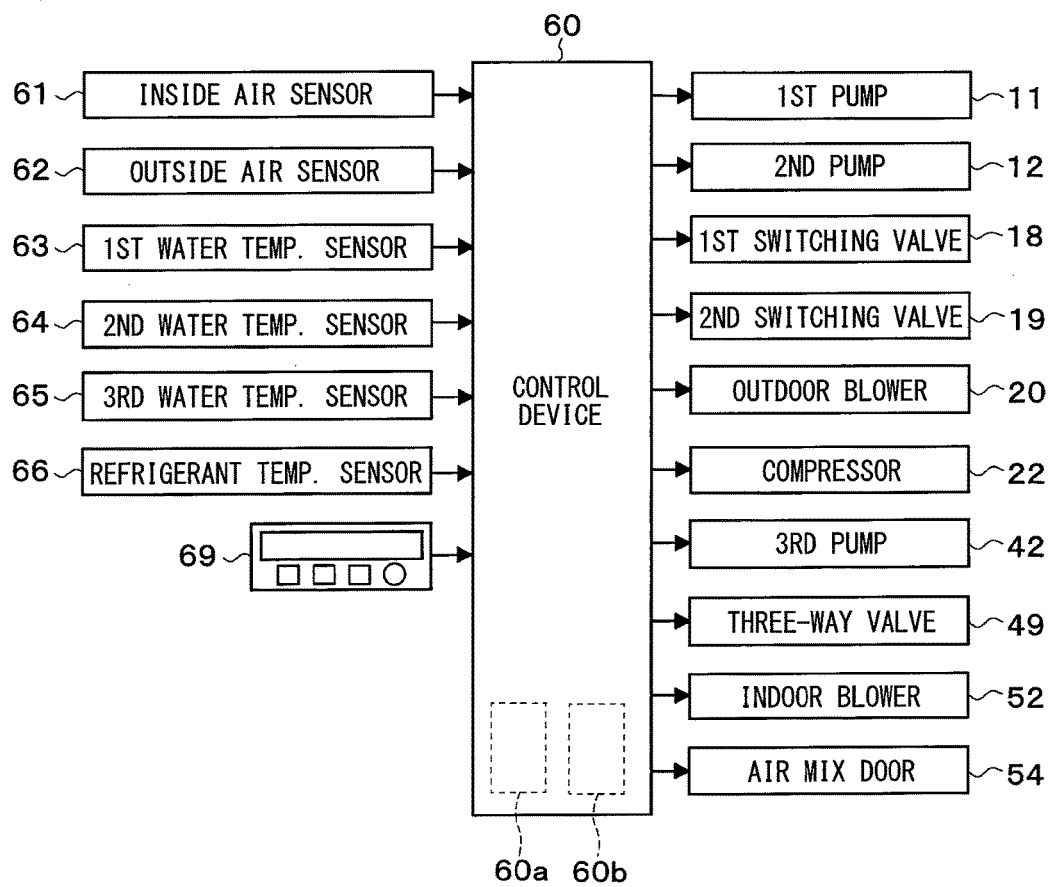
FIG. 3 is a schematic diagram illustrating an electric control unit in the vehicular thermal management system according to the first embodiment.

The operation of the first throttle valve 83a and the second throttle valve 83b is controlled by a control device 60 (FIG. 3).

A flow rate adjustment valve 80 includes a first flow rate adjustment valve 80a and a second flow rate adjustment valve 80b. In other words, the flow rate adjustment valve 80 includes two two-way valves 80a and 80b. The flow rate adjustment valve 80 may include one three-way valve.

In the present embodiment, since a reserve tank 81 is located in the engine cooling circuit 40, the pressure of the coolant in the engine cooling circuit 40 is adjusted by the reserve tank 81.

The first connection flow path 47 communicates portions (pump discharge side portions) of the first cooling circuit C1 and the second cooling circuit C2 in which a pressure of the coolant is higher with a portion (pump discharge side portion) of the engine cooling circuit 40 in which a pressure of the coolant is higher.

According to the above configuration, since the highest pressure of the first cooling circuit C1 and the second cooling circuit C2 can be limited to the same degree as the highest pressure of the engine cooling circuit 40, the equipments disposed in the first cooling circuit C1 and the second cooling circuit C2 can be protected by a set pressure of the reserve tank 81.

A third pump 42 of the engine cooling circuit 40, the first pump 11 of the first cooling circuit C1, and the second pump 12 of the second cooling circuit C2 may operate differently in lifting height from each other. In particular, the third pump 42 may depend on the rotating speed of an engine 43.

When the engine cooling circuit 40, and the first cooling circuit C1 or the second cooling circuit C2 operate differently in the lifting height from each other, one of the first throttle valve 83a and the second throttle valve 83b on the circuit side higher in pump lifting height is throttled to increase the pressure loss. As a result, the flow rate of the coolant flowing from the circuit side higher in the pump lifting height can be suppressed, and the reverse flow to the circuit side lower in the pump lifting height can be suppressed. Further, a mixing ratio of the coolant in the mixing flow path 82 can be appropriately maintained.

In the present embodiment, the mixing flow path 82 communicates the first connection flow path 47 with the second connection flow path 48. The first connection flow path 47 may communicate the circuit having the reserve tank 81 with portions of the respective remaining circuits in which a pressure of the coolant is higher than the second average pressure. The second average pressure means an average pressure of the pump discharge pressure and the pump intake pressure in the respective remaining circuits.

The first throttle valve 83a throttles a flow of the coolant in the second connection flow path 48 between the mixing flow path 82 and the engine cooling circuit 40 having the reserve tank 81. The second throttle valve 83b throttles a flow of the coolant in the second connection flow path 48 between the mixing flow path 82 and the respective remaining circuits.

According to the above configuration, since the highest pressure of the respective remaining circuits can be limited to the same degree as the highest pressure of the circuit having the reserve tank 81, the equipments disposed in the respective remaining circuits can be protected. The first throttle valve 83a and the second throttle valve 83b make it possible to restrain the coolant from reversely flowing between the engine cooling circuit 40 having the reserve tank 81 and the respective remaining circuits.

The above embodiments can be appropriately combined together. The above embodiments can be variously modified, for example, as follows.

(1) Various equipments can be used as the temperature adjustment target equipments (cooling target equipment, heating target equipment) to be adjusted in temperature (cooling, heating) by the coolant. For example, a heat exchanger, which is built into a seat on which an occupant is to sit and cools and heats the seat by a coolant, may be used as the temperature adjustment target equipment. The number of temperature adjustment target equipments may be appropriately changed.

(2) In the above-mentioned embodiments, the coolant cooler 14 for cooling the coolant, which cools a coolant by the low-pressure refrigerant of the refrigeration cycle 21, is used as cooling means for cooling the coolant to a temperature lower than the temperature of the outside air. Alternatively, a Peltier element may be used as the cooling means.

(3) In the above respective embodiments, the engine 43 may be replaced with various heat generation equipments (for example, fuel cell) that generate heat in association with operation.

(4) In the above respective embodiments, the heater core 17 may be replaced with various heat utilization equipments (for example, battery) using heat.

(5) In the above-mentioned respective embodiments, the coolant is used as the heat medium for adjusting the temperatures of the temperature adjustment target equipments. Alternatively, various media such as oil may be used as the heat medium.

Nanofluid may be used as the heat medium. The nanofluid is fluid with which nanoparticles having a diameter of the order of nanometers are mixed. When nanoparticles are mixed with a heat medium, the following effects can be obtained in addition to the effect of lowering a freezing point like a coolant using ethylene glycol (so-called antifreeze).

That is, an effect of improving thermal conductivity in a specific temperature zone, an effect of increasing the heat capacity of the heat medium, an effect of preventing the corrosion of a metal pipe, an effect of preventing the degradation of a rubber pipe, and an effect of increasing the fluidity of the heat medium at an extremely low temperature can be obtained.

These effects are variously changed according to the structure, the shape, and the mixing ratio of the nanoparticles and additives.

According to this, thermal conductivity can be improved. Accordingly, even though an amount of heat medium less than a coolant using ethylene glycol is used, equivalent cooling efficiency can be obtained.

Further, since the heat capacity of the heat medium can be increased, the cold quantity stored in a coolant and the amount of heat stored in a coolant (cold and heat stored using sensible heat) of the heat medium per se can be increased.

With an increase in the cold quantity, even in a state where the compressor 22 does not operate, because the adjustment of cooling and heating of the equipment using cold heat storage can be implemented for a certain amount of time, the power saving of the vehicular thermal management system can be performed.

It is preferable that the aspect ratio of the nanoparticle is 50 or more. The reason is because sufficient thermal conductivity can be obtained. Meanwhile, the aspect ratio is a shape index that shows a ratio of the vertical size of the nanoparticle to the horizontal size thereof.

A nanoparticle, which contains any of Au, Ag, Cu, and C, can be used as the nanoparticle. Specifically, an Au nanoparticle, an Ag nanowire, CNT (carbon nano-tube), graphene, a graphite core-shell type nanoparticle (a particle having a structure, such as a carbon nano-tube, so as to surround the atoms), CNT containing Au nanoparticles, and the like can be used as the constituent atoms of the nanoparticle.

(6) A fluorocarbon refrigerant is used as the refrigerant in the refrigeration cycle 21 of each of the above-mentioned embodiments. However, the type of the refrigerant is not limited thereto, and a natural refrigerant, such as carbon dioxide, a hydrocarbon-based refrigerant, and the like may be used as the refrigerant.

Further, the refrigeration cycle 21 of each of the above-mentioned embodiments forms a subcritical refrigeration cycle of which high pressure-side refrigerant pressure does not exceed the critical pressure of a refrigerant, but may form a supercritical refrigeration cycle of which high pressure-side refrigerant pressure exceeds the critical pressure of a refrigerant.

(7) In the above respective embodiments, the example in which the thermal management system 10 is applied to a hybrid vehicle has been described. Alternatively, the thermal management system 10 may be applied to an electric vehicle that is not provided with an engine and obtains a drive force for the traveling of a vehicle from a travel electric motor.

What is claimed is:

1. A thermal management system for a vehicle, comprising:
   a first pump that draws and discharges a heat medium;
   a second pump that draws and discharges the heat medium;
   a third pump that draws and discharges the heat medium;
   a heat medium circulation equipment through which the heat medium circulates;
   a first switching valve connected with an outlet side of the first pump, an outlet side of the second pump, and an inlet side of the heat medium circulation equipment, the first switching valve switching between a state in which the heat medium discharged from the first pump flows into the heat medium circulation equipment and a state in which the heat medium discharged from the second pump flows into the heat medium circulation equipment;
   a second switching valve connected with an intake side of the first pump, an intake side of the second pump, and an outlet side of the heat medium circulation equipment, the second switching valve switching between a state in which the heat medium flows out of the heat medium circulation equipment and into the first pump and a state in which the heat medium flows out of the heat medium circulation equipment and into the second pump;
   a heat medium circuit in which the heat medium discharged by the third pump circulates;
   a heat generation equipment disposed in the heat medium circuit and generating a heat;
   a heat utilization equipment connected to at least one of the first switching valve and the second switching valve and connected to the heat medium circuit, the heat utilization equipment utilizing the heat of the heat medium; and
   a switching device that switches between a state in which the heat medium discharged by one of the first pump and the second pump circulates through the heat utilization equipment and a state in which the heat medium discharged by the third pump circulates through the heat utilization equipment.

2. The thermal management system for a vehicle, according to claim 1, wherein, when the heat medium discharged by the one of the first pump and the second pump circulates through the heat utilization equipment, the switching device blocks the heat medium discharged by the third pump from flowing through the heat utilization equipment.

3. The thermal management system for a vehicle, according to claim 1, wherein, when the heat medium discharged by the third pump circulates through the heat utilization equipment, at least one of the first switching valve and the second switching valve, or the switching device blocks the heat medium discharged by the first pump and the heat medium discharged by the second pump from flowing through the heat utilization equipment.

4. The thermal management system for a vehicle, according to claim 1, further comprising:
   a branch part that branches a flow of the heat medium discharged from the first pump into a flow toward the first switching valve and a flow toward the heat utilization equipment; and
   a merging part that merges the heat medium flowing out of the second switching valve and the heat medium flowing out of the heat utilization equipment.

5. The thermal management system for a vehicle, according to claim 1, further comprising:
   a pressure adjustment device disposed in any one circuit of a first circulation circuit in which the heat medium discharged by the first pump circulates, a second circulation circuit in which the heat medium discharged by the second pump circulates, and the heat medium circuit, the pressure adjustment device adjusting a pressure of the heat medium; and
   a first communication portion and a second communication portion through which the circuit provided with the pressure adjustment device communicates with the other two circuits, respectively, wherein
   an average pressure of a pump discharge pressure and a pump suction pressure in the circuit provided with the pressure adjustment device is defined as a first average pressure,
   the pressure of the heat medium is higher than the first average pressure on a predetermined portion of the circuit provided with the pressure adjustment device, and
   the predetermined portion of the circuit provided with the pressure adjustment device communicates with the other two circuits through the first communication portion.

6. The thermal management system for a vehicle, according to claim 5, wherein
   an average pressure of a pump discharge pressure and a pump suction pressure in the respective other two circuits is defined as a second average pressure,
   the pressure of the heat medium is lower than the second average pressure on respective predetermined portions of the other two circuits, and
   the circuit provided with the pressure adjustment device communicates with the respective predetermined portions of the other two circuits through the first communication portion.

7. The thermal management system for a vehicle, according to claim 5, further comprising:
   a third communication portion through which the first communication portion communicates with the second communication portion, wherein
   an average pressure of a pump discharge pressure and a pump suction pressure in the respective other two circuits is defined as a second average pressure,
   the pressure of the heat medium is higher than the second average pressure on respective predetermined portions of the other two circuits, and
   the circuit provided with the pressure adjustment device communicates with the respective predetermined portions of the other two circuits through the first communication portion,
   the thermal management system further comprising:
   a first narrowed part in the second communication portion disposed between the third communication portion and the circuit provided with the pressure adjustment device, the first narrowed part narrowing a flow of the heat medium; and
   a second narrowed part in the second communication portion disposed between the third communication portion and the other two circuits, the second narrowed part narrowing a flow of the heat medium.

8. The thermal management system for a vehicle, according to claim 5, wherein
   each of the remaining two circuits has a communication hole that communicates with the second communication portion, and
   the communication hole is open upward in a direction of gravity.

9. The vehicle management system for a vehicle, according to claim 5, wherein
the first communication portion has two branch flow channels which are connected, respectively, to the other two circuits, and
the second communication portion has two branch flow channels which are connected, respectively, to the other two circuits.

10. The thermal management system for a vehicle, according to claim 1, wherein
the switching device switches among a state in which the heat medium discharged by the one of the first pump and the second pump flows through the heat utilization equipment, a state in which the heat medium discharged by the other of the first pump and the second pump flows through the heat utilization equipment, and a state in which the heat medium discharged by the third pump flows through the heat utilization equipment, and
when the heat medium discharged by the other of the first and second pumps flows through the heat utilization equipment, the switching device blocks the heat medium discharged by the third pump from flowing through the heat utilization equipment.

11. The thermal management system for a vehicle, according to claim 10, further comprising:
a heat medium cooling unit that cools the heat medium by absorbing the heat of the heat medium; and
a second heat utilization equipment that uses the heat of the heat medium, wherein
when the heat medium discharged by the first pump flows in the heat utilization equipment, the switching device allows the heat medium discharged by the third pump to circulate through the heat medium cooling unit and the second heat utilization equipment.

12. The thermal management system for a vehicle, according to claim 1, wherein the switching device is disposed between the heat utilization equipment and the at least one of the first switching valve and the second switching valve in a flow of the heat medium.

13. The thermal management system for a vehicle, according to claim 1, wherein
the heat utilization equipment is connected to the first switching valve and the second switching valve, and
the switching device is disposed between the first switching valve or the second switching valve, and the heat utilization equipment in a flow of the heat medium.

14. The thermal management system for a vehicle, according to claim 1, further comprising:
a heat medium heating unit that heats the heat medium, wherein
the heat medium heating unit is disposed in series with the heat utilization equipment and on an upstream side of the heat utilization equipment, in a flow of the heat medium.

15. The thermal management system for a vehicle, according to claim 14, further comprising:
a bypass passage through which the heat medium flowing out of the heat medium heating unit flows with bypassing the heat utilization equipment, wherein
the switching device is disposed between the heat medium heating unit and the heat utilization equipment in a flow of the heat medium,
the bypass passage is connected to the switching device,
when the heat medium discharged by the one of the first pump and the second pump circulates through the heat utilization equipment, the switching device blocks the heat medium from flowing through the bypass passage, and
when the heat medium discharged by the third pump circulates through the heat utilization equipment, the switching device allows the heat medium to circulate through the bypass passage.

16. The thermal management system for a vehicle, according to claim 15, further comprising:
a flow path for the heat medium, which extends from the heat utilization equipment to the one of the first pump and the second pump, wherein
the flow path for the heat medium, which extends from the heat utilization equipment to the one, has a branch part that branches to the heat medium circuit, and
the bypass passage is connected to a portion located on a downstream side of the branch part.

17. The thermal management system for a vehicle, claim 1, wherein
the at least one of the first switching valve and the second switching valve, and the switching device is switchable into a state in which the heat medium discharged by the first pump, the heat medium discharged by the second pump, and the heat medium discharged by the third pump do not circulate through the heat utilization equipment.

18. The thermal management system for a vehicle, according to claim 1, wherein
the at least one of the first switching valve and the second switching valve is connected with the heat medium circuit, and
the at least one switching valve is used as the switching device.

19. The thermal management system for a vehicle, according to any one of claim 1, further comprising:
a heat-medium outside-air heat exchanger in which the heat medium circulating through the heat medium circuit and the outside air exchange heat with each other, and
the heat utilization equipment and the heat-medium outside-air heat exchanger are disposed in parallel to each other in a flow of the heat medium in the heat medium circuit.

* * * * *